United States Patent
Mohamed et al.

(10) Patent No.: US 12,311,637 B2
(45) Date of Patent: May 27, 2025

(54) LAMINATED GLAZING ASSEMBLY INCLUDING AN ANTENNA ASSEMBLY

(71) Applicant: AGC Automotive Americas Co., Alpharetta, GA (US)

(72) Inventors: Abdelhalim Mohamed, Canton, MI (US); Koichi Saito, Novi, MI (US)

(73) Assignee: AGC Automotive Americas Co., Alpharetta, GA (US)

( * ) Notice: Subject to any disclaimer, the term of this patent is extended or adjusted under 35 U.S.C. 154(b) by 223 days.

(21) Appl. No.: 17/980,664

(22) Filed: Nov. 4, 2022

(65) Prior Publication Data
US 2024/0149563 A1  May 9, 2024

(51) Int. Cl.
*B32B 17/10* (2006.01)
*B32B 7/12* (2006.01)
(Continued)

(52) U.S. Cl.
CPC ......... *B32B 17/10376* (2013.01); *B32B 7/12* (2013.01); *B32B 17/10036* (2013.01);
(Continued)

(58) Field of Classification Search
CPC ...... H01Q 1/1271; H01Q 1/1285; H01Q 1/38; B32B 7/12; B32B 17/10036;
(Continued)

(56) References Cited

U.S. PATENT DOCUMENTS

| | | |
|---|---|---|
| 3,208,070 A | 9/1965 | Boicey |
| 3,484,583 A | 12/1969 | Shaw, Jr. |

(Continued)

FOREIGN PATENT DOCUMENTS

| | | |
|---|---|---|
| CN | 106410398 A | 2/2017 |
| CN | 110466323 A | 11/2019 |

(Continued)

OTHER PUBLICATIONS

English language abstract and machine-assisted English translation for JP 2006-151373 A extracted from espacenet.com database on Nov. 13, 2024, 12 pages.

(Continued)

*Primary Examiner* — Dameon E Levi
*Assistant Examiner* — Leah Rosenberg
(74) *Attorney, Agent, or Firm* — Howard & Howard Attorneys PLLC

(57) ABSTRACT

A laminated glazing assembly includes an outer glass substrate, an inner glass substrate, and a polymeric interlayer disposed therebetween. The laminated glazing assembly also includes an antenna assembly disposed between the polymeric interlayer and one of the outer glass substrate and the inner glass substrate. The antenna assembly includes a film layer that carries a radiating element. The film layer may be a transparent film layer having a refractive index of from 1.45 to 1.55. The radiating element includes conductive wires disposed on the film layer and configured to be energized to transmit and/or receive radio frequency signals. The laminated glazing assembly may also include an adhesive layer disposed between the film layer and one of the outer glass substrate and the inner glass substrate, and a feeding element coupled to the inner glass substrate and capacitively coupled to the antenna assembly to energize the antenna assembly to transmit and/or receive radio frequency signals.

17 Claims, 16 Drawing Sheets

(51) Int. Cl.
*B32B 23/08* (2006.01)
*B32B 23/20* (2006.01)
*B32B 27/08* (2006.01)
*B32B 27/30* (2006.01)
*B32B 27/32* (2006.01)
*B32B 27/40* (2006.01)
*H01Q 1/12* (2006.01)

(52) U.S. Cl.
CPC .... *B32B 17/10761* (2013.01); *B32B 17/1077* (2013.01); *B32B 23/08* (2013.01); *B32B 23/20* (2013.01); *B32B 27/08* (2013.01); *B32B 27/306* (2013.01); *B32B 27/325* (2013.01); *B32B 27/40* (2013.01); *H01Q 1/1285* (2013.01); *B32B 2274/00* (2013.01); *B32B 2307/202* (2013.01); *B32B 2307/206* (2013.01); *B32B 2307/41* (2013.01); *B32B 2307/412* (2013.01); *B32B 2307/414* (2013.01); *B32B 2307/418* (2013.01); *B32B 2307/558* (2013.01); *B32B 2307/581* (2013.01); *B32B 2307/732* (2013.01); *B32B 2605/006* (2013.01)

(58) Field of Classification Search
CPC ........ B32B 17/10376; B32B 17/10761; B32B 17/1077; B32B 23/08; B32B 23/20; B32B 27/08; B32B 27/306; B32B 27/325; B32B 27/40; B32B 2274/00; B32B 2307/41
See application file for complete search history.

(56) References Cited

U.S. PATENT DOCUMENTS

| | | | |
|---|---|---|---|
| 3,680,132 A | | 7/1972 | Tolliver |
| 3,945,014 A | | 3/1976 | Kunert et al. |
| 3,987,449 A | | 10/1976 | DeAngelis et al. |
| 4,086,595 A | | 4/1978 | Cherenko et al. |
| 4,209,687 A | | 6/1980 | Bethge et al. |
| 5,083,135 A | | 1/1992 | Nagy et al. |
| 5,119,106 A | | 6/1992 | Murakami |
| 5,132,161 A | | 7/1992 | Shibata et al. |
| 5,307,076 A | * | 4/1994 | Murakami ........ B32B 17/10385 343/704 |
| 5,336,565 A | | 8/1994 | Muromachi et al. |
| 5,355,144 A | | 10/1994 | Walton et al. |
| 5,445,694 A | | 8/1995 | Gillner et al. |
| 5,540,961 A | | 7/1996 | Reul et al. |
| 5,596,335 A | | 1/1997 | Dishart et al. |
| 5,670,966 A | | 9/1997 | Dishart et al. |
| 5,712,645 A | | 1/1998 | Jellum et al. |
| 5,792,298 A | | 8/1998 | Sauer et al. |
| 5,872,542 A | | 2/1999 | Simons et al. |
| 5,902,536 A | | 5/1999 | Shumaker, Jr. et al. |
| 5,926,141 A | | 7/1999 | Lindenmeier et al. |
| 5,999,134 A | | 12/1999 | Dishart et al. |
| 6,020,855 A | * | 2/2000 | Nagy ................ H01Q 1/1285 343/711 |
| 6,097,345 A | | 8/2000 | Walton |
| 6,198,447 B1 | | 3/2001 | Sauer |
| 6,320,276 B1 | * | 11/2001 | Sauer ................ B32B 17/10174 343/711 |
| 6,384,790 B2 | * | 5/2002 | Dishart ............. B32B 17/10174 343/713 |
| 6,396,026 B2 | | 5/2002 | Gillner et al. |
| 6,480,170 B1 | | 11/2002 | Langley et al. |
| 6,501,932 B2 | | 12/2002 | Obu et al. |
| 6,552,690 B2 | | 4/2003 | Veerasamy |
| 6,933,891 B2 | | 8/2005 | Lange |
| 7,119,751 B2 | | 10/2006 | Li et al. |
| 7,233,296 B2 | | 6/2007 | Song et al. |
| 7,289,073 B2 | | 10/2007 | Song et al. |
| 7,342,547 B2 | | 3/2008 | Maniwa et al. |
| 7,345,640 B2 | | 3/2008 | Watari et al. |
| 7,388,548 B2 | | 6/2008 | Maeuser |
| 7,425,926 B2 | | 9/2008 | Funatsu |
| 7,675,471 B2 | | 3/2010 | Yegin et al. |
| 7,722,948 B2 | | 5/2010 | Dixon et al. |
| 7,745,838 B2 | | 6/2010 | Lefevre |
| 7,847,745 B2 | | 12/2010 | Martin |
| 7,847,753 B2 | | 12/2010 | Ishibashi et al. |
| 7,903,042 B2 | | 3/2011 | Urban et al. |
| 8,077,100 B2 | | 12/2011 | Baranski |
| 8,189,254 B2 | | 5/2012 | Voss et al. |
| 8,350,766 B2 | | 1/2013 | Hisaeda |
| 8,546,729 B2 | | 10/2013 | Derda |
| 8,634,764 B2 | | 1/2014 | Cruz et al. |
| 8,786,516 B2 | | 7/2014 | Parsche |
| 8,836,592 B2 | | 9/2014 | Paulus et al. |
| 9,050,779 B2 | | 6/2015 | Derda |
| 9,118,114 B2 | | 8/2015 | Kagaya et al. |
| 9,231,213 B2 | | 1/2016 | Song et al. |
| 9,381,722 B2 | | 7/2016 | Dixon et al. |
| 9,509,038 B2 | | 11/2016 | Kagaya et al. |
| 9,634,374 B2 | | 4/2017 | Baranski |
| 9,653,792 B2 | | 5/2017 | Dai |
| 9,660,344 B2 | | 5/2017 | Pan et al. |
| 9,755,300 B2 | | 9/2017 | Kagaya et al. |
| 9,764,533 B2 | | 9/2017 | Boote |
| 9,837,699 B2 | | 12/2017 | Dai |
| 10,027,015 B2 | | 7/2018 | Kim et al. |
| 10,116,777 B2 | | 10/2018 | Kil et al. |
| 10,205,216 B2 | | 2/2019 | Talty et al. |
| 10,305,163 B2 | | 5/2019 | Song et al. |
| 10,320,053 B2 | | 6/2019 | Song et al. |
| 10,347,964 B2 | | 7/2019 | Droste et al. |
| 10,349,516 B2 | | 7/2019 | Frey et al. |
| 10,381,704 B2 | | 8/2019 | Talty et al. |
| 10,396,427 B2 | | 8/2019 | Talty et al. |
| 10,396,428 B2 | | 8/2019 | Daniel et al. |
| 10,446,907 B2 | | 10/2019 | Patel et al. |
| 10,490,877 B2 | | 11/2019 | Talty et al. |
| 10,498,008 B1 | | 12/2019 | Song et al. |
| 10,522,904 B2 | | 12/2019 | Song et al. |
| 10,530,036 B2 | | 1/2020 | Talty et al. |
| 10,573,952 B2 | | 2/2020 | Shukutani et al. |
| 10,608,330 B2 | | 3/2020 | Talty et al. |
| 10,637,124 B2 | | 4/2020 | Nagata et al. |
| 10,707,553 B2 | | 7/2020 | Talty et al. |
| 10,707,554 B2 | | 7/2020 | Talty et al. |
| 10,737,469 B2 | | 8/2020 | Droste et al. |
| 10,747,375 B2 | | 8/2020 | Yoshida et al. |
| 10,797,373 B2 | | 10/2020 | Hughes et al. |
| 10,811,760 B2 | | 10/2020 | Dai |
| 10,847,887 B2 | | 11/2020 | Tombs |
| 10,910,692 B2 | | 2/2021 | Furlan |
| 10,910,718 B2 | | 2/2021 | Yashiro et al. |
| 10,944,161 B2 | | 3/2021 | Kim et al. |
| 10,992,051 B2 | | 4/2021 | Qin |
| 10,998,609 B2 | | 5/2021 | Tsuchiya et al. |
| 11,038,264 B2 | | 6/2021 | Son et al. |
| 11,052,640 B2 | | 7/2021 | Schmalbuch et al. |
| 11,088,443 B2 | | 8/2021 | Ryu et al. |
| 11,139,555 B2 | | 10/2021 | Choi et al. |
| 11,139,579 B2 | | 10/2021 | Kakuya et al. |
| 11,165,155 B2 | | 11/2021 | Huh et al. |
| 11,165,171 B2 | | 11/2021 | LeBlanc et al. |
| 11,223,129 B2 | | 1/2022 | Baranski |
| 11,271,303 B2 | | 3/2022 | Yao et al. |
| 11,298,925 B2 | | 4/2022 | Ogumi et al. |
| 11,342,686 B2 | | 5/2022 | Kim et al. |
| 2004/0227681 A1 | | 11/2004 | Deng |
| 2006/0092085 A1 | * | 5/2006 | Hisaeda ............ B32B 17/10761 343/713 |
| 2006/0273966 A1 | * | 12/2006 | Maeuser ........... B32B 17/10036 343/711 |
| 2007/0097009 A1 | | 5/2007 | Torres |
| 2013/0099981 A1 | * | 4/2013 | Vortmeier ................ H01Q 1/32 343/700 MS |
| 2015/0061942 A1 | | 3/2015 | Koyama |
| 2017/0033433 A1 | | 2/2017 | Winkelmann et al. |
| 2019/0022981 A1 | | 1/2019 | Labrot et al. |

(56) References Cited

U.S. PATENT DOCUMENTS

| | | |
|---|---|---|
| 2019/0075195 A1 | 3/2019 | Chiu |
| 2019/0191266 A1 | 6/2019 | Wang et al. |
| 2019/0191267 A1 | 6/2019 | Wang et al. |
| 2019/0245256 A1 | 8/2019 | Song et al. |
| 2020/0023718 A1 | 1/2020 | Funatsu et al. |
| 2020/0193259 A1 | 6/2020 | Thangamani et al. |
| 2021/0028531 A1 | 1/2021 | Dardenne et al. |
| 2021/0114351 A1 | 4/2021 | Shimazumi et al. |
| 2021/0175628 A1* | 6/2021 | Dai ................ H01Q 9/0457 |
| 2021/0242553 A1* | 8/2021 | Hiramatsu ............ H01P 3/082 |
| 2021/0408694 A1 | 12/2021 | Jahromi et al. |
| 2022/0006180 A1 | 1/2022 | Oh et al. |
| 2022/0029278 A1 | 1/2022 | Ryu et al. |
| 2022/0059948 A1 | 2/2022 | Sayama et al. |
| 2022/0077595 A1 | 3/2022 | Takayama et al. |
| 2022/0152987 A1 | 5/2022 | Kolf et al. |
| 2022/0173493 A1 | 6/2022 | Bertel et al. |
| 2022/0302581 A1 | 9/2022 | Sunamoto et al. |
| 2022/0393335 A1 | 12/2022 | Ryu et al. |

FOREIGN PATENT DOCUMENTS

| | | |
|---|---|---|
| CN | 111129743 A | 5/2020 |
| CN | 211764831 U | 10/2020 |
| CN | 111987407 A | 11/2020 |
| CN | 111987408 A | 11/2020 |
| CN | 111987409 A | 11/2020 |
| CN | 111987444 A | 11/2020 |
| CN | 111987445 A | 11/2020 |
| CN | 212073621 U | 12/2020 |
| CN | 11269328 A | 4/2021 |
| CN | 112693288 A | 4/2021 |
| CN | 112736407 A | 4/2021 |
| CN | 112776445 A | 5/2021 |
| CN | 112776569 A | 5/2021 |
| CN | 112864576 A | 5/2021 |
| CN | 112864577 A | 5/2021 |
| DE | 34 02 518 A | 8/1985 |
| DE | 3402518 A1 | 8/1985 |
| DE | 29811147 U1 | 11/1998 |
| DE | 19828122 A1 | 12/1999 |
| DE | 10333620 A1 | 9/2004 |
| DE | 102005042960 A1 | 3/2007 |
| EP | 0594375 A2 | 4/1994 |
| EP | 0717459 A1 | 6/1996 |
| EP | 0911906 B1 | 3/2006 |
| EP | 2574454 A1 | 4/2013 |
| EP | 2851993 A1 | 3/2015 |
| EP | 3516926 B1 | 7/2020 |
| GB | 1097719 A | 1/1968 |
| JP | S6130102 A | 2/1986 |
| JP | H0282701 A | 3/1990 |
| JP | H0286302 A | 3/1990 |
| JP | H02248875 A | 10/1990 |
| JP | 2003017920 A | 1/2003 |
| JP | 3490304 B2 | 1/2004 |
| JP | 2006135764 A | 5/2006 |
| JP | 2006151373 A | 6/2006 |
| JP | 2006157845 A | 6/2006 |
| JP | 2006193338 A | 7/2006 |
| JP | 4074737 B2 | 4/2008 |
| JP | 4277790 B2 | 6/2009 |
| JP | 4281640 B2 | 6/2009 |
| JP | 2010233085 A | 10/2010 |
| JP | 4745217 B2 | 8/2011 |
| JP | 2011172281 A | 9/2011 |
| JP | 5549165 B2 | 7/2014 |
| JP | 2014204377 A | 10/2014 |
| JP | 5682464 B2 | 3/2015 |
| JP | 2017183063 A | 10/2017 |
| JP | 6761591 B2 | 9/2020 |
| KR | 101053056 B1 | 8/2011 |
| KR | 102041690 B1 | 11/2019 |
| KR | 20210057613 A | 5/2021 |
| KR | 20210081028 A | 7/2021 |
| KR | 20210134957 A | 11/2021 |
| WO | 9631918 A1 | 10/1996 |
| WO | 2012153663 A1 | 11/2012 |
| WO | 2013091961 A1 | 6/2013 |
| WO | 2018079415 A1 | 5/2018 |
| WO | 2018145843 A1 | 8/2018 |
| WO | 2020031886 A1 | 2/2020 |
| WO | 2020059430 A1 | 3/2020 |
| WO | 2020193384 A1 | 10/2020 |
| WO | 2020207885 A1 | 10/2020 |
| WO | 2020207886 A1 | 10/2020 |
| WO | WO 2020/207885 A | 10/2020 |
| WO | 2021002295 A1 | 1/2021 |
| WO | 2021023497 A1 | 2/2021 |
| WO | 2021032655 A1 | 2/2021 |
| WO | 2021044928 A1 | 3/2021 |
| WO | 2021104887 A1 | 6/2021 |
| WO | 2021110400 A1 | 6/2021 |
| WO | 2021110713 A1 | 6/2021 |
| WO | 2021110714 A1 | 6/2021 |
| WO | 2021112031 A1 | 6/2021 |
| WO | 2021162377 A1 | 8/2021 |
| WO | 2021171026 A1 | 9/2021 |
| WO | 2021229994 A1 | 11/2021 |
| WO | 2022019591 A1 | 1/2022 |
| WO | 2022045084 A1 | 3/2022 |
| WO | 2022101498 A1 | 5/2022 |
| WO | 2022101507 A1 | 5/2022 |

OTHER PUBLICATIONS

English language abstract and machine-assisted English translation for JP 2010-233085 A extracted from espacenet.com database on Nov. 13, 2024, 14 pages.

English language abstract for WO 2018/079415 A1 extracted from espacenet.com database on Nov. 13, 2024, 2 pages.

ASTM International, "ASTM D1003-21, Standard Test Method for Haze and Luminous Transmittance of Transparent Plastics", 2021, 7 pages.

ASTM International, "ASTM D542-22, Standard Test Method Index of Refraction of Transparent Organic Plastics", 2022, 4 pages.

English language abstract and machine-assisted English translation for CN 106410398 A extracted from espacenet.com database on Nov. 17, 2022, 5 pages.

English language abstract and machine-assisted English translation for CN 110466323 A extracted from espacenet.com database on Nov. 17, 2022, 15 pages.

English language abstract and machine-assisted English translation for CN 111129743 A extracted from espacenet.com database on Nov. 17, 2022, 17 pages.

English language abstract and machine-assisted English translation for CN 111987407 A extracted from espacenet.com database on Nov. 17, 2022, 22 pages.

English language abstract and machine-assisted English translation for CN 111987408 A extracted from espacenet.com database on Nov. 17, 2022, 20 pages.

English language abstract and machine-assisted English translation for CN 111987409 A extracted from espacenet.com database on Nov. 17, 2022, 14 pages.

English language abstract and machine-assisted English translation for CN 111987444 A extracted from espacenet.com database on Nov. 17, 2022, 21 pages.

English language abstract and machine-assisted English translation for CN 111987445 A extracted from espacenet.com database on Nov. 17, 2022, 22 pages.

English language abstract and machine-assisted English translation for CN 112693288 A extracted from espacenet.com database on Nov. 17, 2022, 15 pages.

English language abstract and machine-assisted English translation for CN 112736407 A extracted from espacenet.com database on Nov. 7, 2022, 12 pages.

English language abstract and machine-assisted English translation for CN 112776445 A extracted from espacenet.com database on Nov. 17, 2022, 14 pages.

(56) References Cited

OTHER PUBLICATIONS

English language abstract and machine-assisted English translation for CN 112776569 A extracted from espacenet.com database on Nov. 17, 2022, 14 pages.
English language abstract and machine-assisted English translation for CN 112864576 A extracted from espacenet.com database on Nov. 7, 2022, 16 pages.
English language abstract and machine-assisted English translation for CN 112864577 A extracted from espacenet.com database on Nov. 17, 2022, 15 pages.
English language abstract and machine-assisted English translation for CN 211764831 U extracted from espacenet.com database on Nov. 17, 2022, 12 pages.
English language abstract and machine-assisted English translation for CN 212073621 U extracted from espacenet.com database on Nov. 17, 2022, 12 pages.
English language abstract and machine-assisted English translation for DE 10 2005 042 960 A1 extracted from espacenet.com database on Nov. 17, 2022, 8 pages.
English language abstract and machine-assisted English translation for DE 10 33 3620 A1 extracted from espacenet.com database on Nov. 17, 2022, 8 pages.
English language abstract and machine-assisted English translation for DE 198 28 122 A1 extracted from espacenet.com database on Nov. 17, 2022, 6 pages.
English language abstract and machine-assisted English translation for DE 34 02 518 A extracted from espacenet.com database on Nov. 17, 2022, 8 pages.
English language abstract and machine-assisted English translation for EP 0 717 459 A1 extracted from espacenet.com database on Nov. 17, 2022, 8 pages.
English language abstract and machine-assisted English translation for EP 2 574 454 A1 extracted from espacenet.com database on Nov. 17, 2022, 10 pages.
English language abstract and machine-assisted English translation for JP 2003-017920 A extracted from espacenet.com database on Nov. 17, 2022, 8 pages.
English language abstract and machine-assisted English translation for JP 2006-135764 A extracted from espacenet.com database on Nov. 17, 2022, 12 pages.
English language abstract and machine-assisted English translation for JP 2006-157845 A extracted from espacenet.com database on Nov. 17, 2022, 34 pages.
English language abstract and machine-assisted English translation for JP 2006-193338 A extracted from espacenet.com database on Nov. 17, 2022, 8 pages.
English language abstract and machine-assisted English translation for JP 2011-172281 A extracted from espacenet.com database on Nov. 7, 2022, 11 pages.
English language abstract and machine-assisted English translation for JP 2014-204377 A extracted from espacenet.com database on Nov. 7, 2022, 8 pages.
English language abstract and machine-assisted English translation for JP 2017-183063 A extracted from espacenet.com database on Nov. 7, 2022, 23 pages.
English language abstract and machine-assisted English translation for JP 4277790 B2 extracted from espacenet.com database on Nov. 17, 2022, 9 pages.
English language abstract and machine-assisted English translation for JP 4281640 B2 extracted from espacenet.com database on Nov. 17, 2022, 10 pages.
English language abstract and machine-assisted English translation for JP 4745217 B2 extracted from espacenet.com database on Nov. 17, 2022, 12 pages.
English language abstract and machine-assisted English translation for JP 5549165 B2 extracted from espacenet.com database on Nov. 7, 2022, 22 pages.
English language abstract and machine-assisted English translation for JP 5682464 B2 extracted from espacenet.com database on Nov. 7, 2022, 23 pages.
English language abstract and machine-assisted English translation for JP 6761591 B2 extracted from espacenet.com database on Nov. 7, 2022, 31 pages.
English language abstract and machine-assisted English translation for JPH 02-248875 A extracted from espacenet.com database on Nov. 17, 2022, 5 pages.
English language abstract and machine-assisted English translation for JPH 02-82701 A extracted from espacenet.com database on Nov. 17, 2022, 5 pages.
English language abstract and machine-assisted English translation for JPH 02-86302 A extracted from espacenet.com database on Nov. 17, 2022, 5 pages.
English language abstract and machine-assisted English translation for JPS 61-30102 A extracted from espacenet.com database on Nov. 17, 2022, 5 pages.
English language abstract and machine-assisted English translation for KR 101053056 B1 extracted from espacenet.com database on Nov. 7, 2022, 9 pages.
English language abstract and machine-assisted English translation for KR 102041690 B1 extracted from espacenet.com database on Nov. 7, 2022, 20 pages.
English language abstract and machine-assisted English translation for KR 2021-0057613 A extracted from espacenet.com database on Nov. 7, 2022, 14 pages.
English language abstract and machine-assisted English translation for KR 2021-0081028 A extracted from espacenet.com database on Nov. 7, 2022, 15 pages.
English language abstract and machine-assisted English translation for WO 2013/091961 A1 extracted from espacenet.com database on Nov. 17, 2022, 17 pages.
English language abstract and machine-assisted English translation for WO 2018/145843 A1 extracted from espacenet.com database on Nov. 17, 2022, 13 pages.
English language abstract and machine-assisted English translation for WO 2020/031886 A1 extracted from espacenet.com database on Nov. 7, 2022, 11 pages.
English language abstract and machine-assisted English translation for WO 2020/059430 A1 extracted from espacenet.com database on Nov. 7, 2022, 10 pages.
English language abstract and machine-assisted English translation for WO 2020/193384 A1 extracted from espacenet.com database on Nov. 17, 2022, 15 pages.
English language abstract and machine-assisted English translation for WO 2020/207885 A1 extracted from espacenet.com database on Nov. 17, 2022, 14 pages.
English language abstract and machine-assisted English translation for WO 2021/002295 A1 extracted from espacenet.com database on Nov. 7, 2022, 20 pages.
English language abstract and machine-assisted English translation for WO 2021/032655 A1 extracted from espacenet.com database on Nov. 7, 2022, 18 pages.
English language abstract and machine-assisted English translation for WO 2021/044928 A1 extracted from espacenet.com database on Nov. 7, 2022, 19 pages.
English language abstract and machine-assisted English translation for WO 2021/104887 A1 extracted from espacenet.com database on Nov. 7, 2022, 20 pages.
English language abstract and machine-assisted English translation for WO 2021/110400 A1 extracted from espacenet.com database on Nov. 17, 2022, 25 pages.
English language abstract and machine-assisted English translation for WO 2021/110713 A1 extracted from espacenet.com database on Nov. 17, 2022, 16 pages.
English language abstract and machine-assisted English translation for WO 2021/110714 A1 extracted from espacenet.com database on Nov. 17, 2022, 16 pages.
English language abstract and machine-assisted English translation for WO 2021/162377 A1 extracted from espacenet.com database on Nov. 7, 2022, 23 pages.
English language abstract and machine-assisted English translation for WO 2021/229994 A1 extracted from espacenet.com database on Nov. 7, 2022, 30 pages.

(56) References Cited

OTHER PUBLICATIONS

English language abstract and machine-assisted English translation for WO 2022/019591 A1 extracted from espacenet.com database on Nov. 7, 2022, 19 pages.
English language abstract and machine-assisted English translation for WO 2022/045084 A1 extracted from espacenet.com database on Nov. 7, 2022, 23 pages.
English language abstract and machine-assisted English translation for WO 96/31918 A1 extracted from espacenet.com database on Nov. 17, 2022, 13 pages.
English language abstract and machine-assisted English translation of equivalent JP 2014-140088 A for WO 2012/153663 A1 extracted from espacenet.com database on Nov. 17, 2022, 5 pages.
English language abstract for JP 3490304 B2 extracted from espacenet.com database on Nov. 7, 2022, 1 page.
English language abstract for JP 4074737 B2 extracted from espacenet.com database on Nov. 17, 2022, 1 page.
English language abstract for KR 2021-0134957 A extracted from espacenet.com database on Nov. 17, 2022, 2 pages.
English language abstract for WO 2021/112031 A1 extracted from espacenet.com database on Nov. 7, 2022, 2 pages.
Federal Register, "Federal Motor Vehicle Safety Standard No. 205, Glazing Materials", 49 CFR 571.205, https://www.govinfo.gov/app/details/CFR-2011-title49-vol6/CFR-2011-title49-vol6-sec571-205, 2011, 3 pages.
International Organization for Standardization, "ISO 13837" Road Vehicles—Safety Glazing Materials—Method for the Determination of Solar Transmittance, 2021, 20 pages.
Machine-assisted English translation for DE 298 11 147 U1 extracted from espacenet.com database on Nov. 7, 2022, 6 pages.
SAE International, "Surface Vehicle Standard J3097/ANSI Z26.1, Standard for Safety Glazing Materials for Glazing Motor Vehicles and Motor Vehicle Equipment Operating on Land Highways", 2019, 95 pages.
Zhang, Xiaowen et al., "Impact Response of Laminated Glass With Varying Interlayer Materials", International Journal of Impact Engineering, vol. 139, 2020, 15 pages.

\* cited by examiner

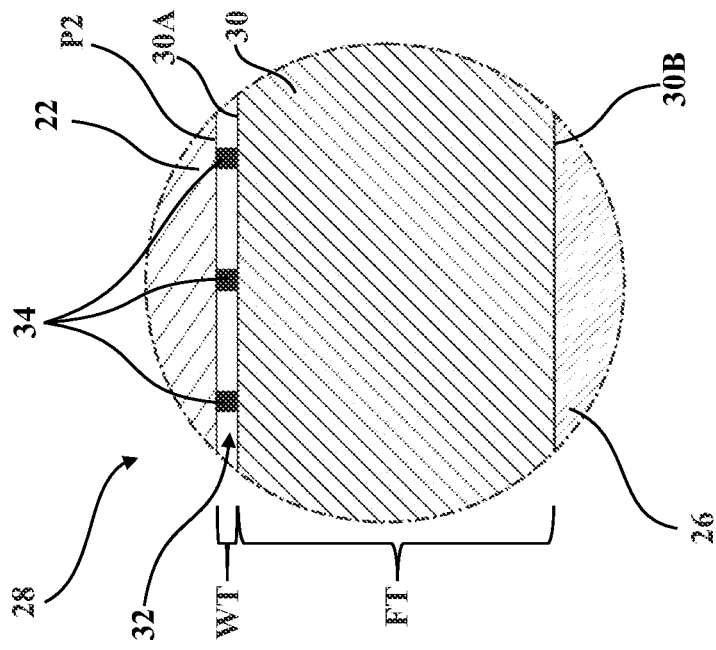
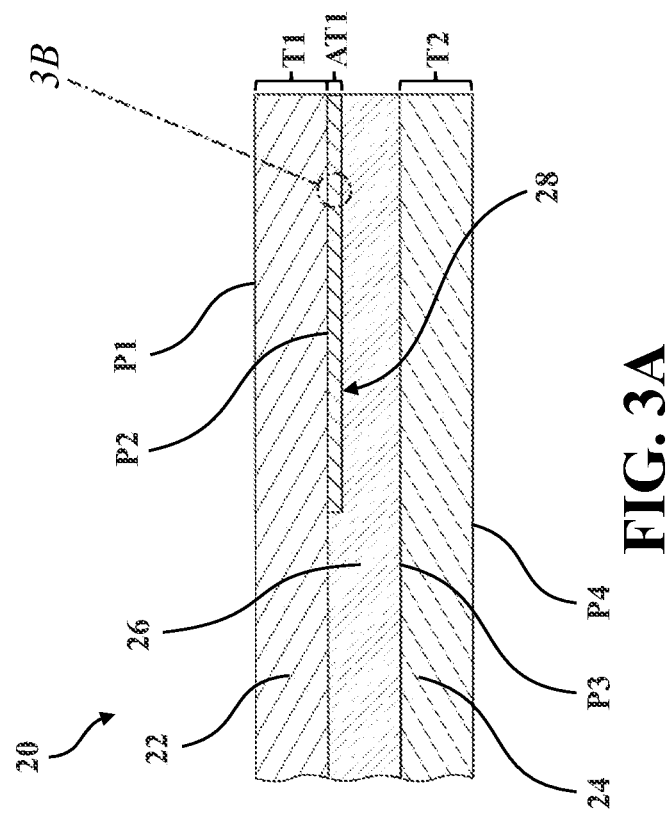
FIG. 3A
FIG. 3B

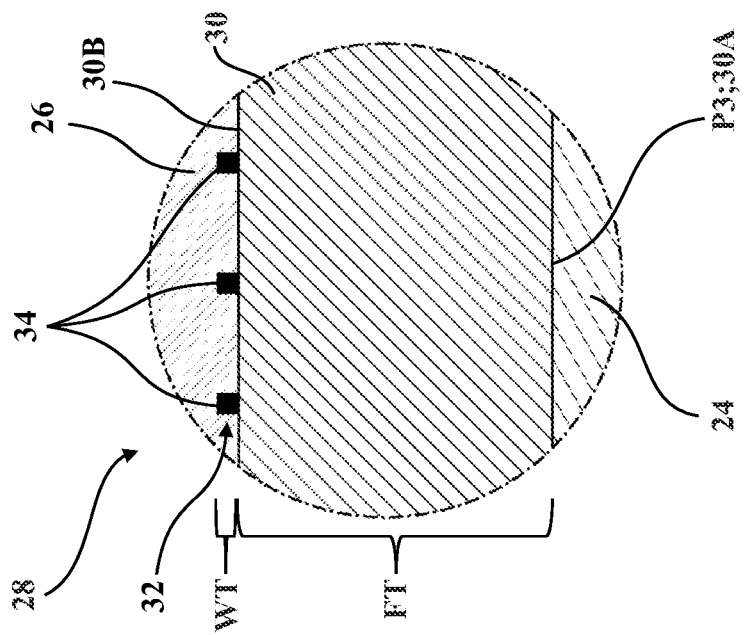
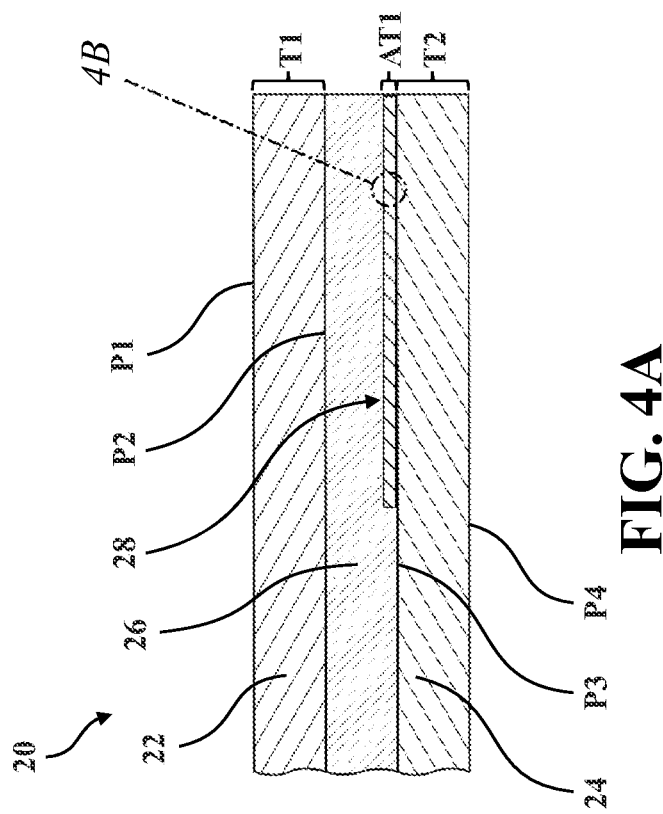
FIG. 4A
FIG. 4B

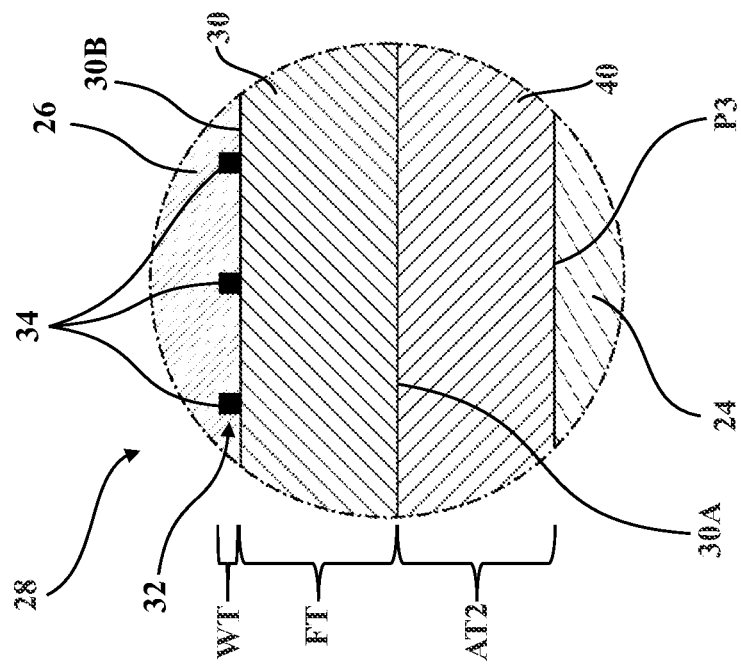
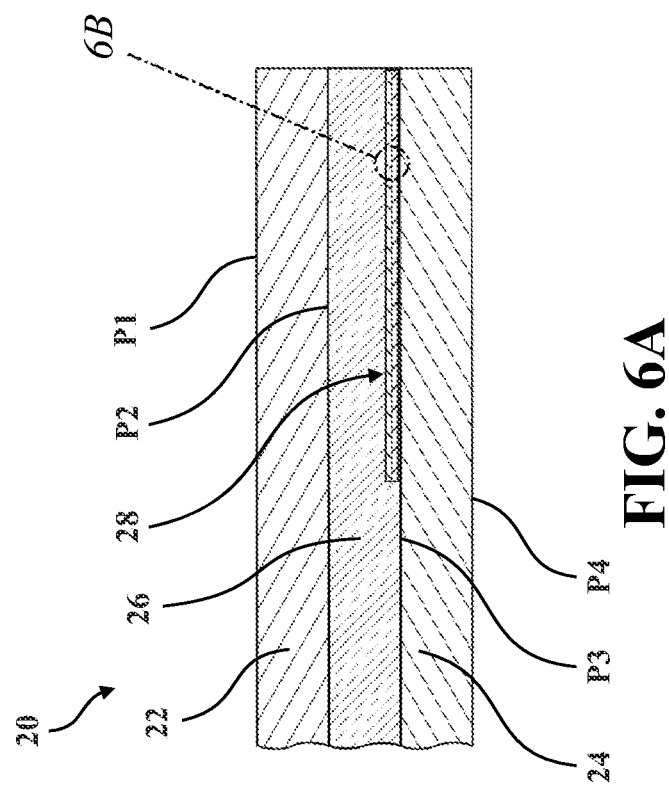
FIG. 6A
FIG. 6B

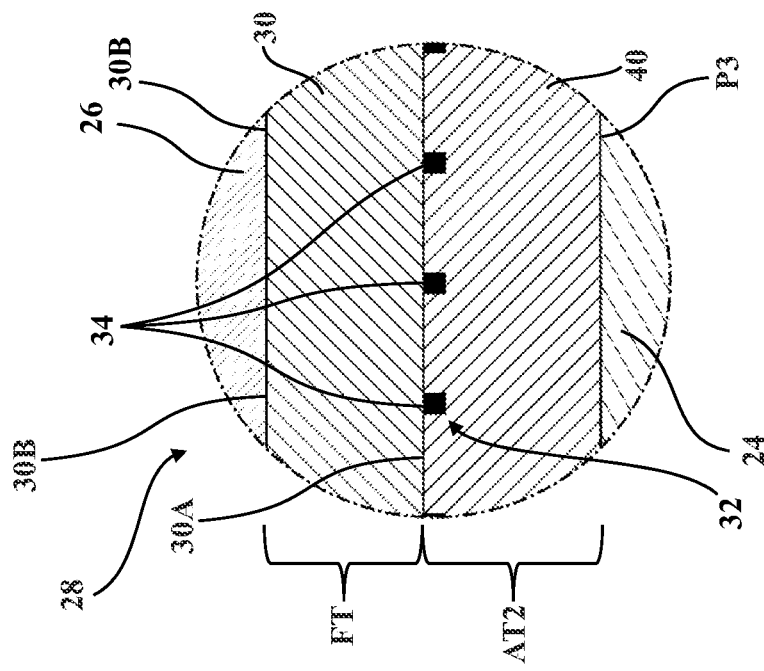
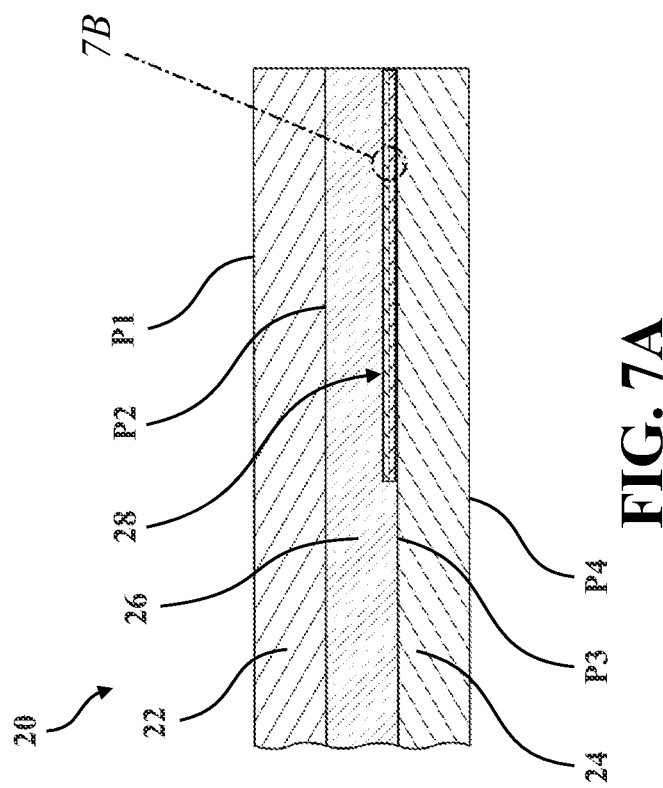
FIG. 7A
FIG. 7B

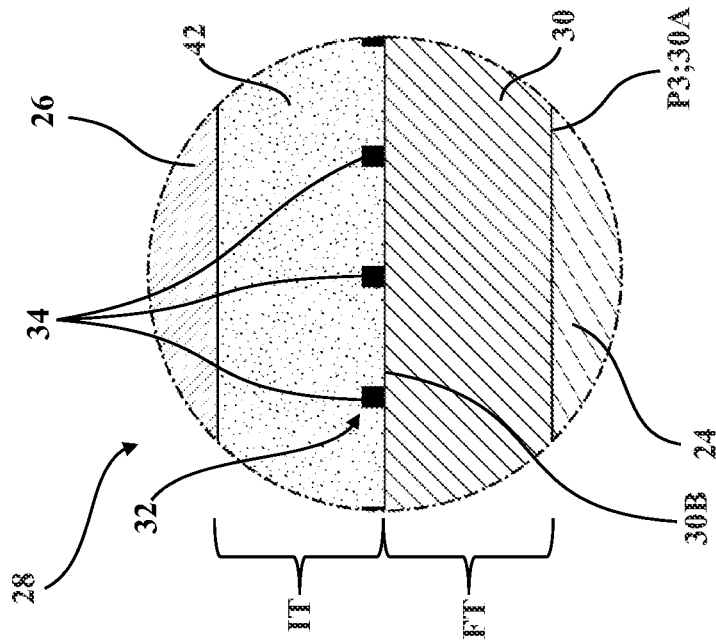
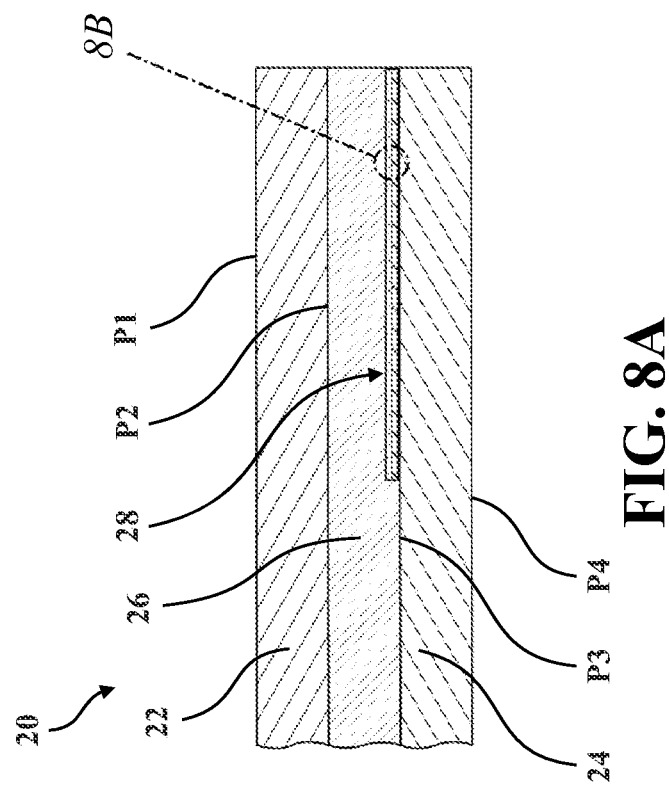
FIG. 8A
FIG. 8B

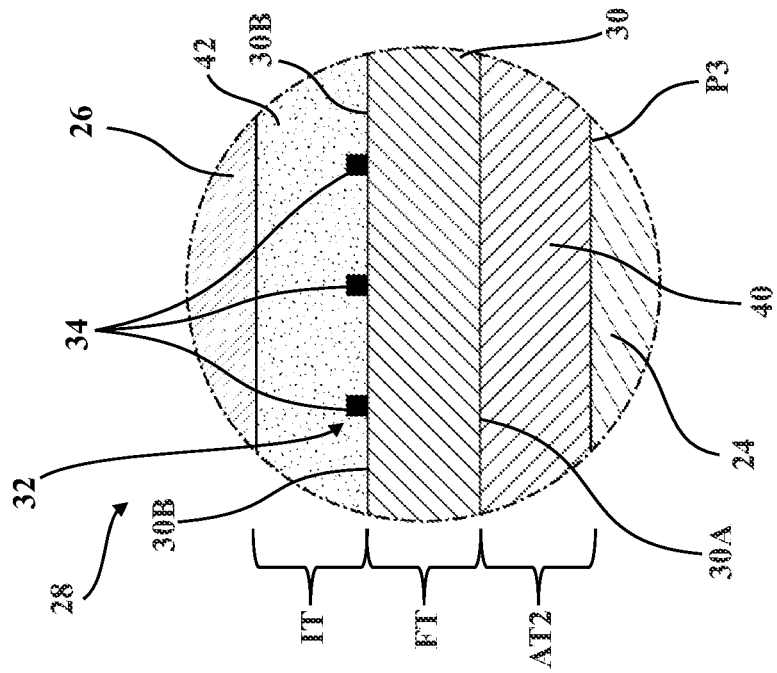
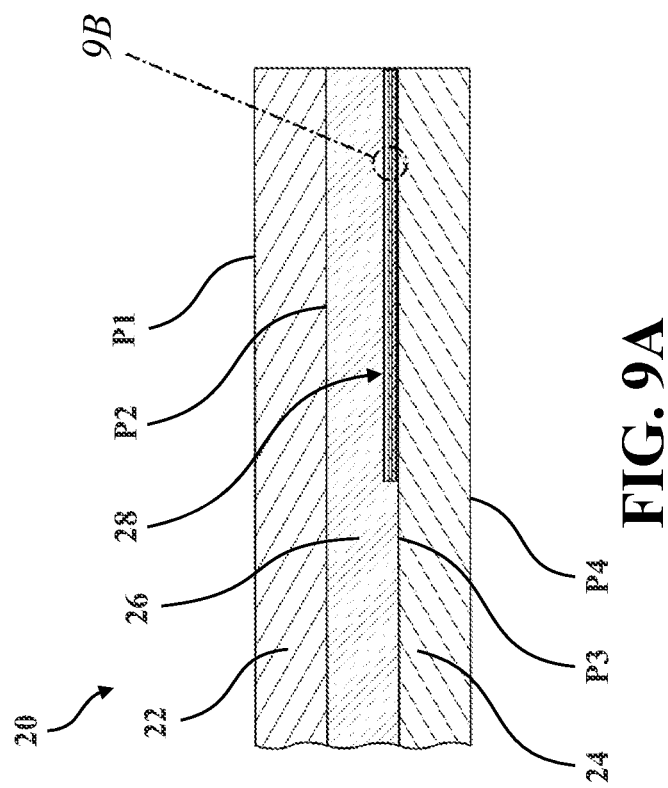
FIG. 9B
FIG. 9A

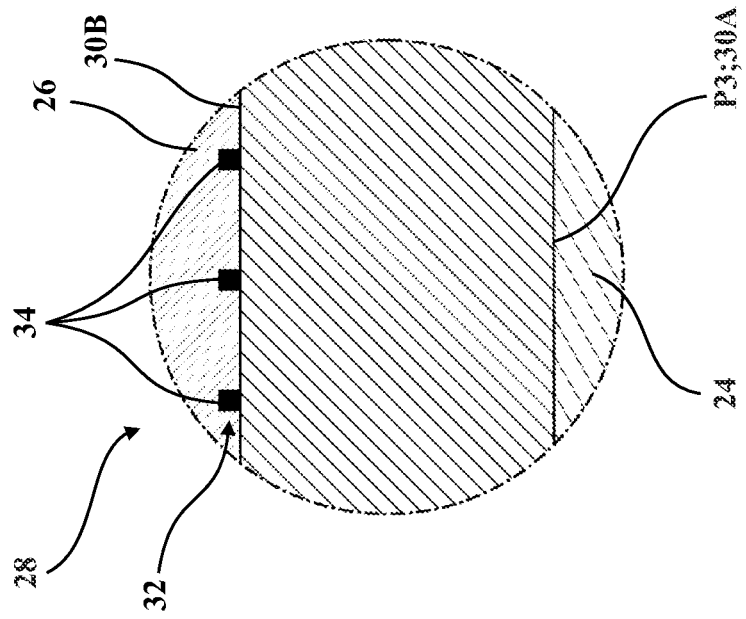
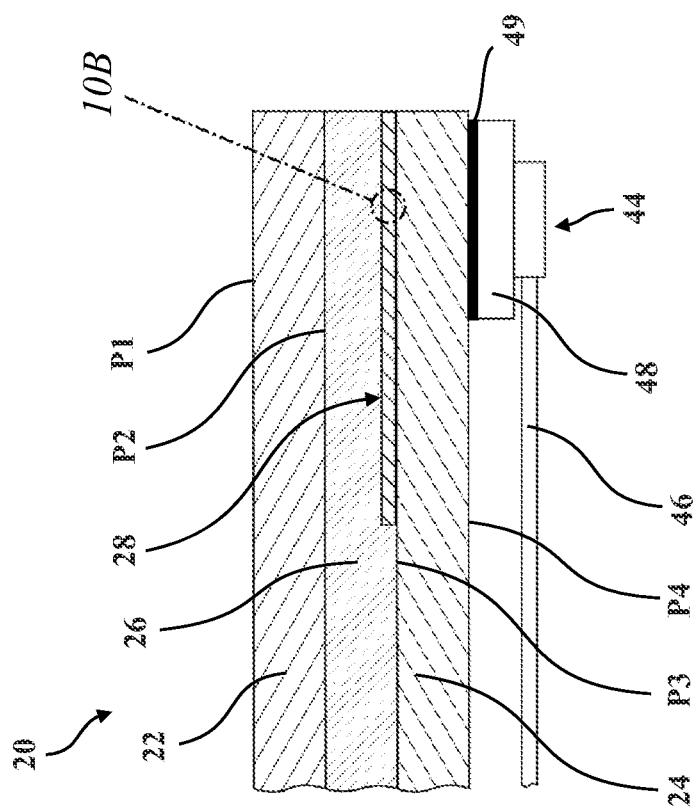
FIG. 10B
FIG. 10A

LAMINATED GLAZING ASSEMBLY INCLUDING AN ANTENNA ASSEMBLY

TECHNICAL FIELD

The present disclosure relates generally to laminated glazing assemblies, and more specifically to laminated glazing assemblies including an antenna assembly.

BACKGROUND

Automobile manufacturers are increasingly looking to expand vehicle connectivity by including a plurality of antennas on and/or within vehicles. As one solution, there have been developments to include antenna assemblies within glass components of vehicles, such as windshields. However, there are significant challenges associated with doing so.

Attempts have been made to dispose a transparent film that carries a radiating element within a laminated windshield. However, these antenna assemblies are often visible when looking through the windshield. In fact, even when these antenna assemblies are transparent, the edges of the transparent film are still perceptible when looking through the laminated windshield. Additionally, including these antenna assemblies within the laminated windshield often presents issues with having sufficient impact resistance and penetration resistance. Furthermore, as the desired frequency ranges for the antenna assemblies increase (e.g. for 5G cellular), it becomes increasingly difficult to eloquently and effectively feed the radiating element contained within the laminated windshield to transmit and/or receive radio frequency signals.

In view of the above, there is a need for an improved laminated glazing assembly including an antenna assembly.

SUMMARY

One general aspect of the present disclosure includes a laminated glazing including an outer glass substrate having an outer surface (P1) and an opposing inner surface (P2), an inner glass substrate having an inner surface (P3) and an opposing outer surface (P4), and a polymeric interlayer disposed between the P2 surface of the outer glass substrate and the P3 surface of the inner glass substrate. The laminated glazing assembly also includes an antenna assembly disposed between the polymeric interlayer and one of the P2 surface and the P3 surface. The antenna assembly has an antenna thickness of 100 micrometers or less and includes a transparent film layer and a radiating element. The transparent film layer has a refractive index of from 1.45 to 1.55 and includes a first surface facing one of the P2 surface and the P3 surface and an opposing second surface facing the polymeric interlayer. The radiating element includes conductive wires disposed on one of the first surface and the second surface of the transparent film layer and configured to be energized to transmit and/or receive radio frequency signals.

Another general aspect of the present disclosure includes a laminated glazing including an outer glass substrate having an outer surface (P1) and an opposing inner surface (P2), an inner glass substrate having an inner surface (P3) and an opposing outer surface (P4), and a polymeric interlayer disposed between the P2 surface of the outer glass substrate and the P3 surface of the inner glass substrate. The laminated glazing assembly also includes an antenna assembly disposed between the polymeric interlayer and one of the P2 surface and the P3 surface. The antenna assembly includes a film layer, an adhesive layer, and a radiating element. The film layer includes a first surface facing one of the P2 surface and the P3 surface and an opposing second surface facing the polymeric interlayer. The radiating element includes conductive wires disposed on one of the first surface and the second surface of the film layer and configured to be energized to transmit and/or receive 5G radio frequency signals. The adhesive layer is disposed between the first surface of the film layer and one of the P2 surface and the P3 surface to couple the film layer to one of the P2 surface and the P3 surface. The laminated glazing assembly defines a total surface area, and the antenna assembly is only disposed on a portion of the laminated glazing assembly that is less than the total surface area. Here, the portion of the laminated glazing assembly where the antenna assembly is disposed has a transmittance of 70% or greater and exhibits impact and penetration resistance in compliance with SAE J3097/ANSI Z26.1 as measured under SAE J3097/ANSI Z26.1.

Yet another general aspect of the present disclosure includes a laminated glazing including an outer glass substrate having an outer surface (P1) and an opposing inner surface (P2), an opaque band disposed on one of the P2 surface and the P4 surface and extending at least partially around a peripheral edge of the laminated glazing assembly, an inner glass substrate having an inner surface (P3) and an opposing outer surface (P4), and a polymeric interlayer disposed between the P2 surface of the outer glass substrate and the P3 surface of the inner glass substrate. The laminated glazing assembly also includes an antenna assembly disposed between the polymeric interlayer and one of the P2 surface and the P3 surface. The antenna assembly includes a film layer including a first surface facing the P3 surface and an opposing second surface facing the polymeric interlayer. The antenna assembly also includes a plurality of conductive wires disposed on one of the first surface and the second surface of the film layer and arranged to form a mesh having an aperture ratio of 90% or greater. The antenna assembly further includes a coupling portion electrically coupled to the mesh and disposed on the same surface of the film layer as the conductive wires and arranged at the peripheral edge of the laminated glazing assembly. Further, the laminated glazing assembly additionally includes a feeding element coupled to the P4 surface and aligned with the coupling portion such that the opaque band obscures the feeding element as the laminated glazing assembly is viewed from the P1 surface, the feeding element capacitively coupled to the coupling portion of the antenna assembly to energize the antenna assembly to transmit and/or receive 5G radio frequency signals.

BRIEF DESCRIPTION OF THE DRAWINGS

Advantages of the present disclosure will be readily appreciated as the same becomes better understood by reference to the following detailed description when considered in connection with the accompanying drawings.

FIG. 3A is a cross-sectional schematic representation of another example of the laminated glazing assembly of FIG. 1A taken along line 3A-3A and including the antenna assembly disposed between the polymeric interlayer and the outer glass substrate.

FIG. 3B is a detail view of FIG. 3A showing an enlarged cross-sectional schematic representation of the laminated glazing assembly including conductive wires disposed on a first surface of the film layer.

FIG. 4A is a cross-sectional schematic representation of yet another example of the laminated glazing assembly of FIG. 1A taken along line 4A-4A and including the antenna assembly disposed between the polymeric interlayer and the inner glass substrate.

FIG. 4B is a detail view of FIG. 4A showing an enlarged cross-sectional schematic representation of the laminated glazing assembly including conductive wires disposed on a second surface of a film layer.

FIG. 6A is a cross-sectional schematic representation of a further example of the laminated glazing assembly of FIG. 1A taken along line 6A-6A and including the antenna assembly disposed between the polymeric interlayer and the inner glass substrate.

FIG. 6B is a detail view of FIG. 6A showing an enlarged cross-sectional schematic representation of the laminated glazing assembly including conductive wires disposed on the second surface of the film layer and an adhesive layer disposed between the film layer and an inner glass substrate.

FIG. 7A is a cross-sectional schematic representation of a still further example of the laminated glazing assembly of FIG. 1A taken along line 7A-7A and including the antenna assembly disposed between the polymeric interlayer and the inner glass substrate.

FIG. 7B is a detail view of FIG. 7A showing an enlarged cross-sectional schematic representation of the laminated glazing assembly including conductive wires disposed on the first surface of the film layer and an adhesive layer disposed between the film layer and an inner glass substrate.

FIG. 8A is a cross-sectional schematic representation of another example of the laminated glazing assembly of FIG. 1A taken along line 8A-8A and including the antenna assembly disposed between the polymeric interlayer and the inner glass substrate.

FIG. 8B is a detail view of FIG. 8A showing an enlarged cross-sectional schematic representation of the laminated glazing assembly including conductive wires disposed on the second surface of the film layer and an insulation layer disposed between a polymeric interlayer and the film layer.

FIG. 9A is a cross-sectional schematic representation of yet another example of the laminated glazing assembly of FIG. 1A taken along line 9A-9A and including the antenna assembly disposed between the polymeric interlayer and the inner glass substrate.

FIG. 9B is a detail view of FIG. 9A showing an enlarged cross-sectional schematic representation of the laminated glazing assembly including conductive wires disposed on the second surface of the film layer, the adhesive layer disposed between the film layer and the inner glass substrate, and the insulation layer disposed between the polymeric interlayer and the film layer.

FIG. 10A is a cross-sectional schematic representation of the laminated glazing assembly of FIG. 1A taken along line 10A-10A and including the antenna assembly disposed between the polymeric interlayer and the inner glass substrate and a feeding element coupled to the inner glass substrate for energizing the antenna assembly.

FIG. 10B is a detail view of FIG. 10A showing an enlarged cross-sectional schematic representation of the laminated glazing assembly including conductive wires disposed on the second surface of the film layer.

DETAILED DESCRIPTION

Figure 1A:
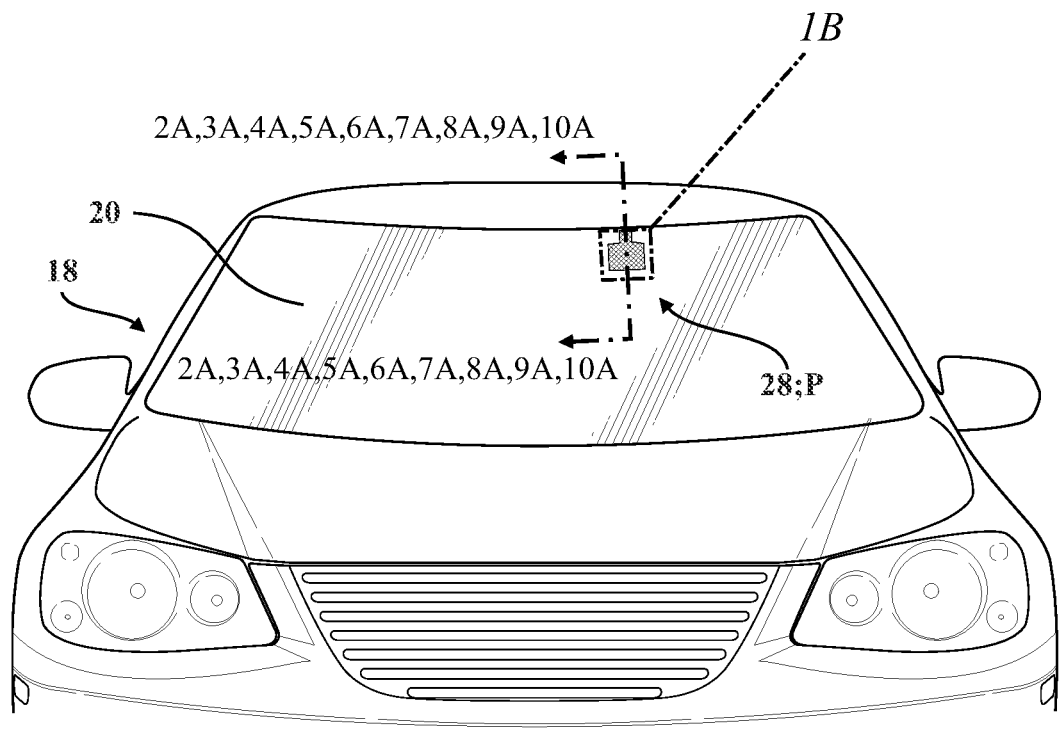
FIG. 1A is a partial front view of a vehicle including a laminated glazing assembly including one example of an antenna assembly.
Figure 1B:
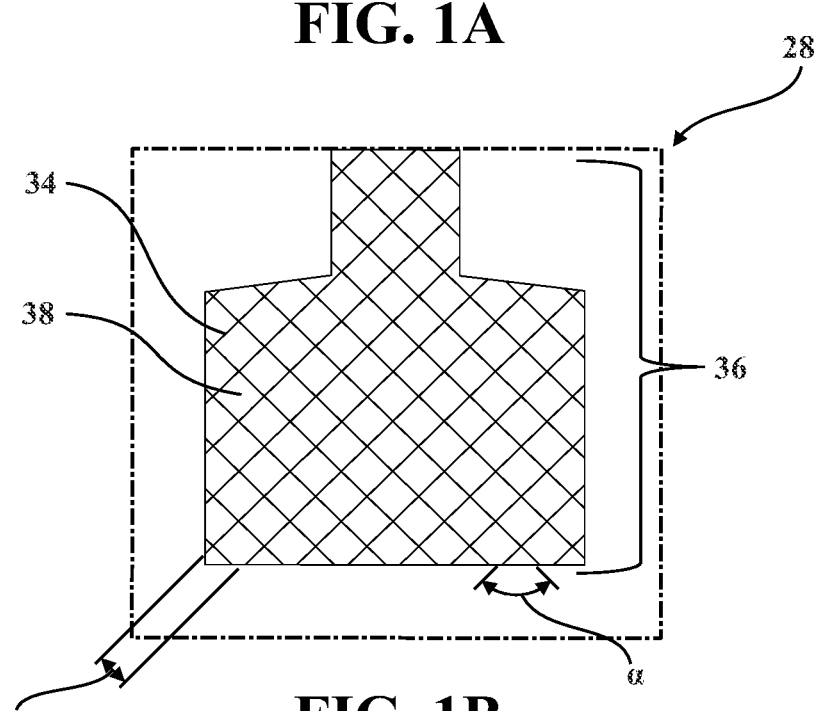
FIG. 1B is an enlarged view of the antenna assembly of FIG. 1A.

Referring to the drawings, wherein like reference numerals are used to identify like or identical components in the various views, FIG. 1 illustrates a laminated glazing assembly 20. The laminated glazing assembly 20 may be used in an automotive context as a window for a vehicle 18, such as a windshield, side window, quarter window, rear window, and the like. Of course, it is to be appreciated that the laminated glazing assembly 20 may also be used outside the automotive context.

Figure 2B:
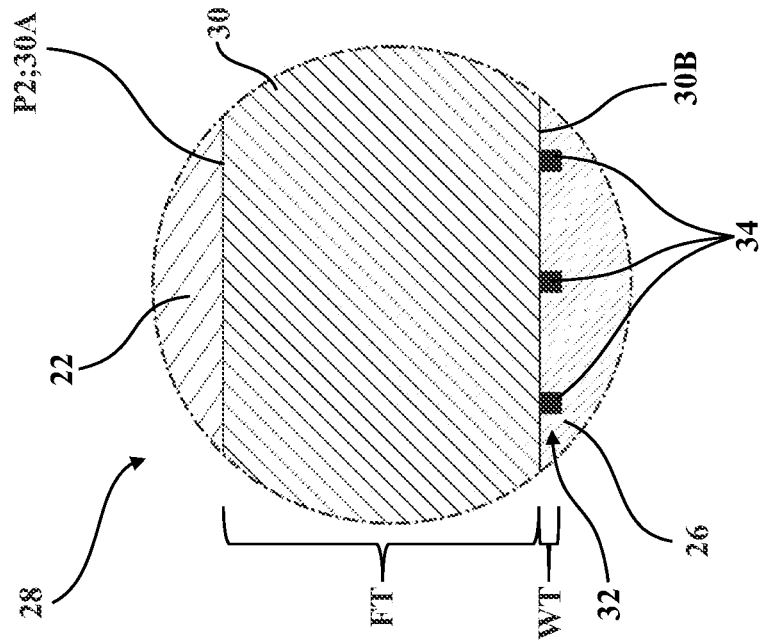
FIG. 2B is a detail view of FIG. 2A showing an enlarged cross-sectional schematic representation of the laminated glazing assembly including conductive wires disposed on a second surface of a film layer.
Figure 2A:
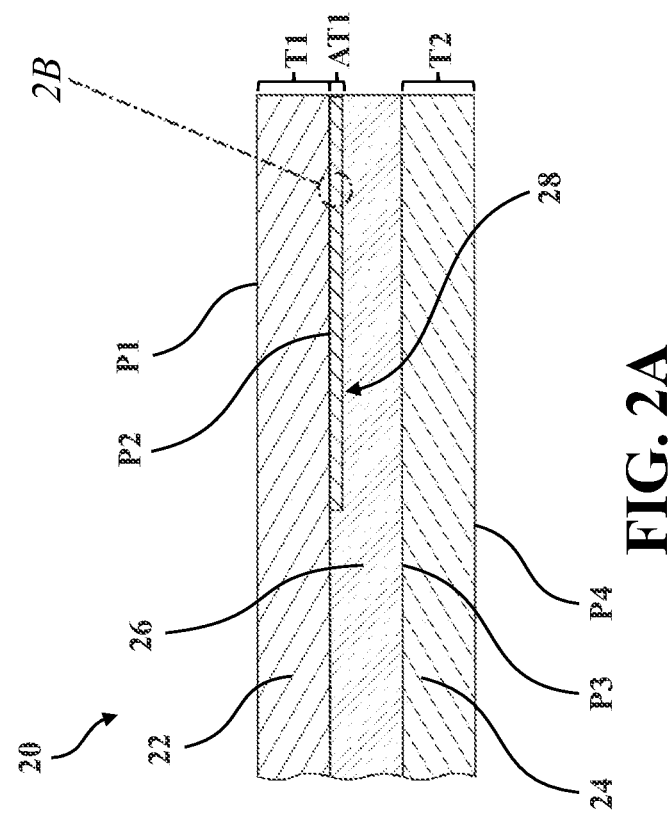
FIG. 2A is a cross-sectional schematic representation of one example of the laminated glazing assembly of FIG. 1A taken along line 2A-2A and including an outer glass substrate, an inner glass substrate, a polymeric interlayer disposed between the outer glass substrate and the inner glass substrate, and the antenna assembly disposed between the polymeric interlayer and the outer glass substrate.

The laminated glazing assembly 20 includes an outer glass substrate 22 and an inner glass substrate 24. FIG. 2A shows one example of a cross-sectional schematic representation of the laminated glazing assembly 20 of FIG. 1 taken along line 2A-2A. The outer glass substrate 22 includes an outer surface (P1) and an opposing inner surface (P2). Similarly, the inner glass substrate 24 includes an inner surface (P3) and an opposing outer surface (P4). In one example, the P4 surface may be arranged to face the interior of the vehicle 18 when installed in the vehicle 18, and the P1 surface may be arranged to face outward from the vehicle 18 when installed in the vehicle 18. The laminated glazing assembly 20 also includes a polymeric interlayer 26 disposed between the P2 surface of the outer glass substrate 22 and the P3 surface of the inner glass substrate 24, and an antenna assembly 28 disposed between the polymeric interlayer 26 and the P3 surface of the inner glass substrate 24.

Both the outer glass substrate 22 and the inner glass substrate 24 may be produced using any suitable glass manufacturing process including, but not limited to, a float process. The outer glass substrate 22 and the inner glass substrate 24 may be comprised of any suitable glass composition including, but not limited to, soda-lime glass, aluminosilicate glass, borosilicate glass, boro-aluminosilicate glass, and the like. It should be appreciated that the outer glass substrate 22 and the inner glass substrate 24 may be comprised of the same or different glass compositions.

The outer glass substrate 22 and the inner glass substrate 24 may be bent using any suitable glass bending process including, but not limited to, press bending, gravity bending (i.e., sag bending), roll forming, or cold bending. The outer glass substrate 22 and the inner glass substrate 24 may be bent into any geometry suitable for the desired application. It should be appreciated that the outer glass substrate 22 and the inner glass substrate 24 may be bent together (i.e., bent while disposed adjacent to each other) or separately.

In some examples, the outer glass substrate 22 and the inner glass substrate 24 are transparent. In this context, the term "transparent", also referred to as "substantially transparent", refers to a material that allows 70% or more of light transmission in a predefined visible light range to travel therethrough. Unless otherwise indicated, the predefined visible light range is the segment of the electromagnetic spectrum that the human eye can view. More simply, this range of wavelengths is called visible light. Typically, the human eye can detect wavelengths from about 380 to about 780 nanometers, and thus the predefined visible light range as defined herein refers to wavelengths of light from about 380 to about 780 nanometers unless otherwise indicated. In some examples, the outer glass substrate 22 and the inner glass substrate 24 may include various additives to alter the transmissivity of the outer glass substrate 22 and the inner glass substrate 24; for example, additives may provide various levels of tint or coloration while still maintaining the outer glass substrate 22 and the inner glass substrate 24 as "transparent" or "substantially transparent" as described above.

In other examples, one or both of the outer glass substrate 22 and the inner glass substrate 24 are not transparent as described above. For example, where the laminated glazing assembly 20 is a privacy glass, the transparency of the laminated glazing assembly 20 is substantially reduced, and thus the laminated glazing assembly 20 allows less than 70% light transmission in a predefined wavelength range, such as from greater than 0 to 70% light transmission at the predefined wavelength range.

The outer glass substrate 22 has a thickness T1, and the inner glass substrate 24 has a thickness T2. The thicknesses T1, T2 of the outer glass substrate 22 and the inner glass substrate 24, respectively, may be any suitable thickness for the application. For example, the thicknesses T1, T2 of the outer glass substrate 22 and the inner glass substrate 24, respectively, may be from about 0.3 mm to about 4.1 mm. More specifically, the thicknesses T1, T2, may each be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm. It should be appreciated that the thickness T1 and the thickness T2 can be the same or different. In one example, the outer glass substrate 22 and the inner glass substrate 24 have the same thickness (i.e., where T1 is equal to T2) such that the laminated glazing assembly 20 is considered a "symmetric" laminate. However, in another example, the outer glass substrate 22 and the inner glass substrate 24 have different thicknesses (i.e., where T1 is not equal to T2) such that the laminated glazing assembly 20 is considered an "asymmetric" laminate. All combinations of the example T1 and T2 values listed above and all fractional values therebetween are contemplated.

The polymeric interlayer 26 bonds the outer glass substrate 22 and the inner glass substrate 24 such that the polymeric interlayer 26 retains the outer glass substrate 22 and/or the inner glass substrate 24 in the event of impact or breakage of the laminated glazing assembly 20. The polymeric interlayer 26 includes a polymer or thermoplastic resin, such as polyvinyl butyral (PVB), ethylene-vinyl acetate (EVA), thermoplastic polyurethane (TPU), and the like. Other suitable materials for implementing the polymeric interlayer 26 may be utilized that provide the requisite performance characteristics regarding optical haze, adhesion to glass, and structural rigidity. Similar to the outer glass substrate 22 and the inner glass substrate 24, the polymeric interlayer 26 is also substantially transparent or otherwise transparent to light. Accordingly, the laminated glazing assembly 20 that includes the polymeric interlayer 26 between the outer glass substrate 22 and the inner glass substrate 24 is also substantially transparent or otherwise transparent to light. It should be appreciated that the polymeric interlayer 26 may be less transparent before being subjected to a lamination process to bond the polymeric interlayer 26 to each of the layers adjacent to the polymeric interlayer 26 to form the laminated glazing assembly 20.

Referring to FIGS. 2A-5B, the antenna assembly 28 is generally disposed between the polymeric interlayer 26 and one of the P2 surface of the outer glass substrate 22 and the P3 surface of the inner glass substrate 24. In other words, the antenna assembly 28 can be disposed between only the P2 surface and the polymeric interlayer 26, between only the P3 surface and the polymeric interlayer 26, or the antenna assembly 28 may include two film layers 30 each carrying a radiating element 32 with one film layer 30 disposed between the P2 surface and the polymeric interlayer 26, and the other film layer 30 disposed between the P3 surface and the polymeric interlayer 26. FIGS. 2A-3B show the antenna assembly 28 disposed between the polymeric interlayer 26 and the P2 surface of the outer glass substrate 22. FIGS. 4A-5B show the antenna assembly 28 disposed between the polymeric interlayer 26 and the P3 surface of the inner glass substrate 24. Accordingly, in either of the arrangements described above, the polymeric interlayer 26 may at least partially encapsulate the antenna assembly 28 to retain the antenna assembly 28 within the laminated glazing assembly 20 (i.e., between the P2 surface of the outer glass substrate 22 and the P3 surface of the inner glass substrate 24).

The antenna assembly 28 includes a film layer 30 that carries a radiating element 32 (described below). The film layer 30 includes a first surface 30A and an opposing second surface 30B. Referring to FIGS. 2A-3B, in examples where the antenna assembly 28 is disposed between the polymeric interlayer 26 and the P2 surface of the outer glass substrate 22, the first surface 30A faces the P2 surface of the outer glass substrate 22, and the second surface 30B faces the polymeric interlayer 26 such that the film layer 30 is disposed between the outer glass substrate 22 and the polymeric interlayer 26. Referring to FIGS. 4A-5B, in examples where the antenna assembly 28 is disposed between the polymeric interlayer 26 and the P3 surface of the inner glass substrate 24, the first surface 30A faces the P3 surface of the inner glass substrate 24, and the second surface 30B faces the polymeric interlayer 26 such that the film layer 30 is disposed between the inner glass substrate 24 and the polymeric interlayer 26. The film layer has a film thickness FT. Although not required, the film thickness FT may be 100 micrometers or less, 90 micrometers or less, 80 micrometers or less, 70 micrometers or less, 60 micrometers or less, 50 micrometers or less, 40 micrometers or less, 30 micrometers or less, 20 micrometers or less, or 20 micrometers or less.

With continued reference to FIGS. 2A-5B, in some embodiments, the film layer 30 is transparent and referred to as a transparent film layer 30. The transparent film layer 30 may have a transmittance of 85% or greater, 90% or greater, or 95% or greater. One suitable technique for measuring transmittance is provided in ASTM D1003 (2021), which is entitled "Standard Test Method for Haze and Luminous Transmittance of Transparent Plastics" and is incorporated by reference in its entirety. Broadly, ASTM D1003 provides that transmittance may be measured using a hazemeter or a spectrophotometer to observe the behavior of light as the light passes through a test specimen. The transparent film layer 30 may also have a haze of 1% or less, 0.5% or less, 0.25% or less, or 0.1% or less. One suitable technique for measuring haze is also provided in ASTM D1003. ASTM D1003 also broadly provides that haze may be measured using a hazemeter or a spectrophotometer to observe the behavior of light as the light passes through a test specimen.

Additionally, when disposing a transparent film within a laminated glazing assembly, it is desirable to select a material having a similar refractive index to that of glass such that the edges of the transparent film are less perceptible to the human eye as viewed through the laminated glazing assembly 20. Thus, in one embodiment, the transparent film layer 30 has a refractive index of from 1.45 to 1.55. As a result, the refractive index of the transparent film layer 30 is relatively close to the refractive index of the outer glass substrate 22, the inner glass substrate 24, and the polymeric interlayer 26. For example, the outer glass substrate 22 and the inner glass substrate 24 may have a refractive index consistent with the known refractive index of soda-lime glass (approximately 1.5), and the polymeric interlayer 26 may have a refractive index consistent with the known refractive index of, for example, polyvinyl butyral (approximately 1.5). Thus, the refractive index of from 1.45 to 1.55 of the transparent film layer 30 approximately "matches" the refractive index of the outer glass substrate 22, the inner glass substrate 24, and the polymeric interlayer 26. As a non-limiting example, the transparent film layer 30 may have a refractive index within 0.05 (i.e., +/−0.05), within 0.03 (i.e., +/−0.03), or within 0.01 (i.e., +/−0.01) of the outer glass substrate 22, the inner glass substrate 24, and/or the polymeric interlayer 26. One suitable technique for measuring refractive index is provided in ASTM D542 (2022), which is entitled "Standard Test Method for Index of Refraction of Transparent Organic Plastics" and is incorporated by reference in its entirety. Broadly, ASTM D542 provides that refractive index may be measured using a refractometer to observe the behavior of light as the light passes through a test specimen.

In other embodiments, the outer glass substrate 22 and the inner glass substrate 24 may have a refractive index lower than approximately 1.5. For example, borosilicate glass is known to have a refractive index of approximately 1.47. Other glass compositions may have an even lower refractive index. Similarly, the polymeric interlayer 26 may have a refractive index lower than approximately 1.5. In these examples, it should also be appreciated that the transparent film layer 30 may have a refractive index within 0.05 (i.e., +/−0.05), within 0.03 (i.e., +/−0.03), or within 0.01 (i.e., +/−0.01) of the outer glass substrate 22, the inner glass substrate 24, and/or the polymeric interlayer 26 to match the refractive index of the outer glass substrate 22, the inner glass substrate 24, and/or the polymeric interlayer 26.

As a result of matching the refractive index of the transparent film layer 30 to the refractive index of the outer glass substrate 22, the inner glass substrate 24, and the polymeric interlayer 26, the edges of the transparent film layer 30 are less perceptible to the human eye when looking through the laminated glazing assembly 20. Accordingly, due to the properties above, the transparent film layer 30 is sufficiently imperceptible to the human eye as viewed through the laminated glazing assembly 20. The transparent film layer 30 may comprise any suitable material having the properties above including, but not limited to, cellulose triacetate (TAC) and cyclic olefin polymer (COP).

In other embodiments, the film layer 30 is a carrier film 30 that carries the radiating element 32. In these embodiments, the carrier film 30 does not necessarily have the refractive index, transmittance, and haze values described above in the context of the transparent film layer 30. However, it should be appreciated that in some applications, the carrier film 30 may have some degree of transparency and one or more of the properties described above in the context of the transparent film layer 30. Any suitable material for the carrier film is contemplated.

Figure 5B:
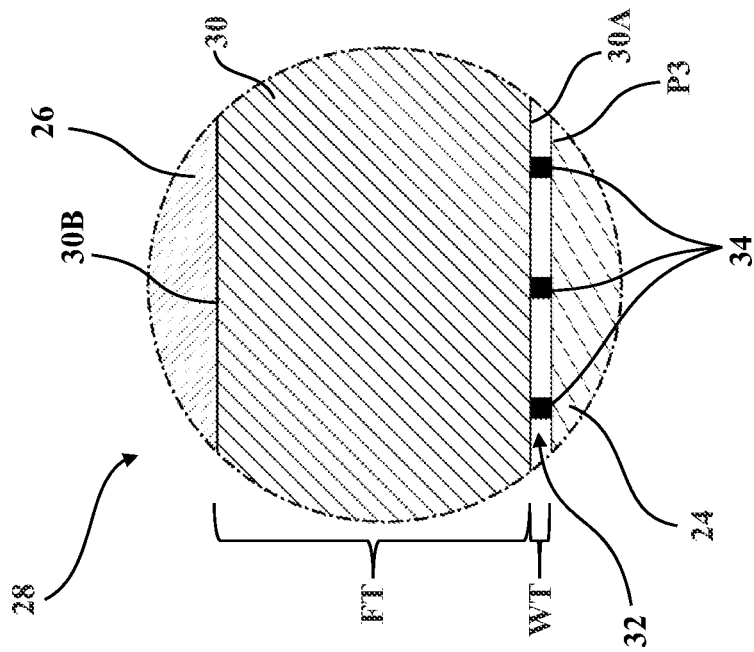
FIG. 5B is a detail view of FIG. 5A showing an enlarged cross-sectional schematic representation of the laminated glazing assembly including conductive wires disposed on a first surface of the film layer.
Figure 5A:
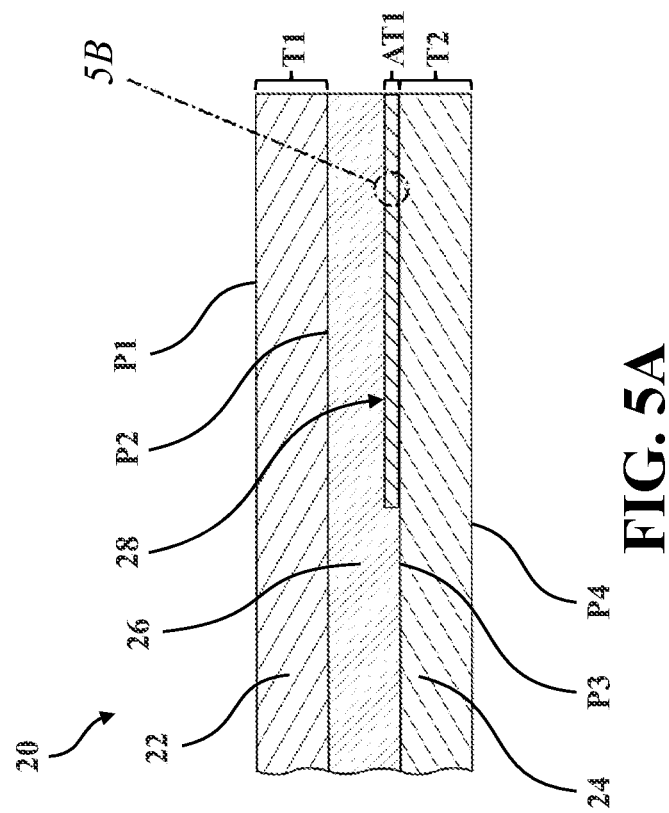
FIG. 5A is a cross-sectional schematic representation of an additional example of the laminated glazing assembly of FIG. 1A taken along line 5A-5A and including the antenna assembly disposed between the polymeric interlayer and the inner glass substrate.
Figure 11A:
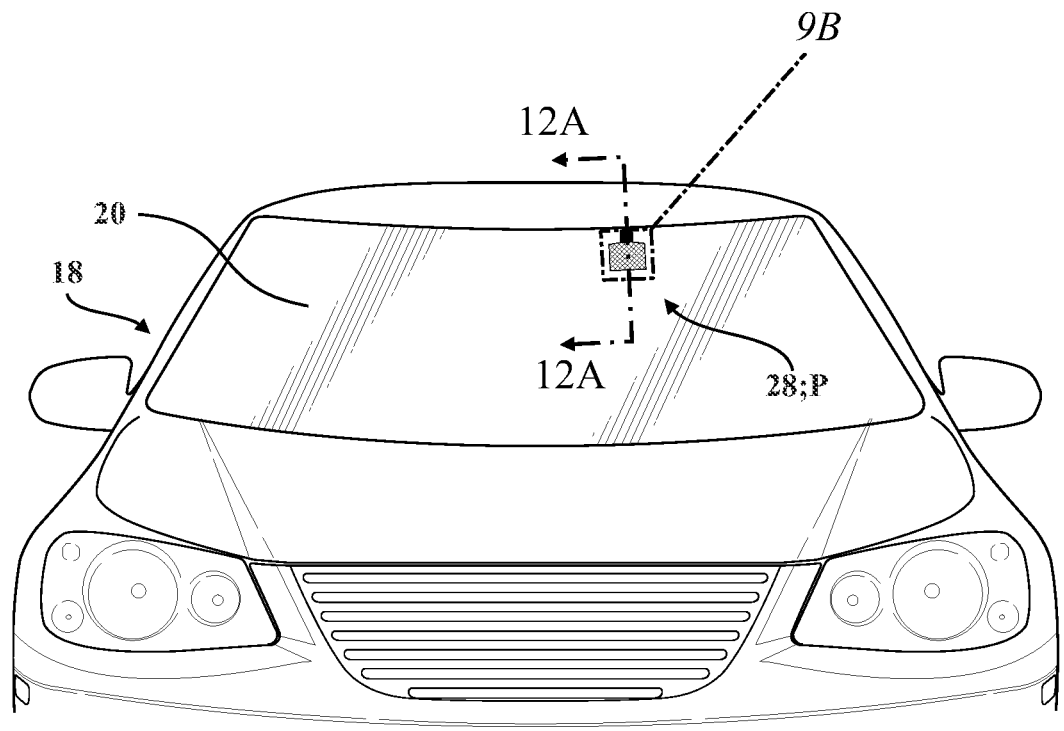
FIG. 11A is a partial front view of a vehicle including a laminated glazing assembly including another example of an antenna assembly including a coupling portion.
Figure 11B:
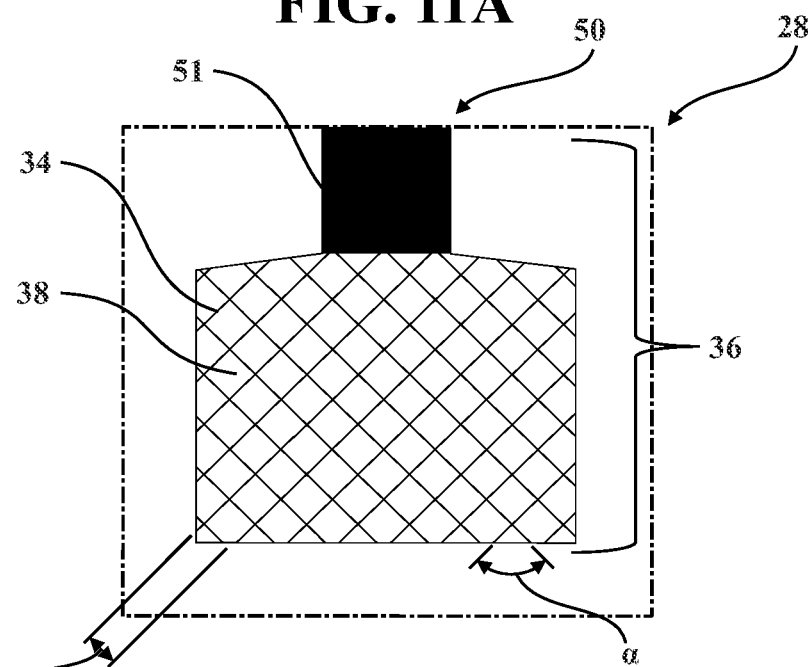
FIG. 11B is an enlarged view of the antenna assembly of FIG. 11A.
Figure 12B:
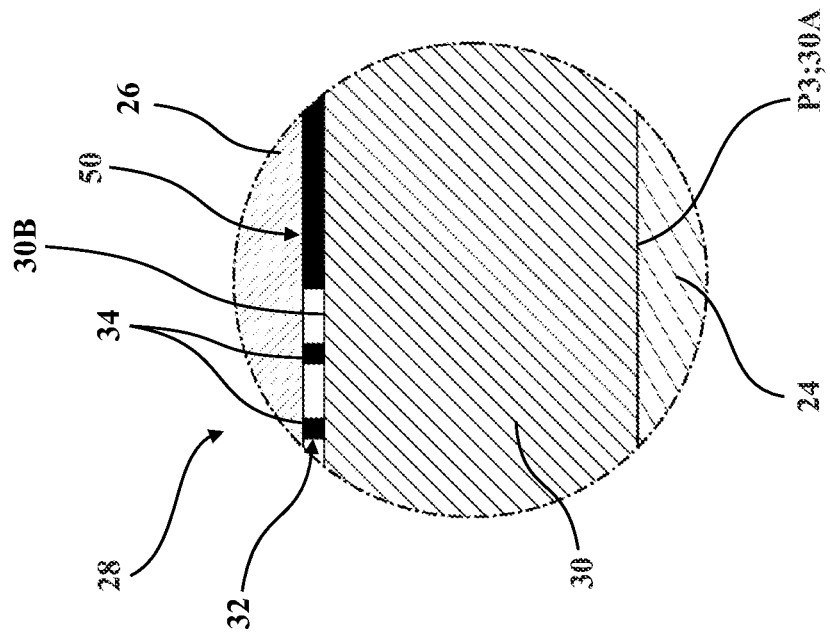
FIG. 12B is a detail view of FIG. 12A showing an enlarged cross-sectional schematic representation of the laminated glazing assembly including conductive wires and the coupling portion disposed on the second surface of the film layer.
Figure 12A:
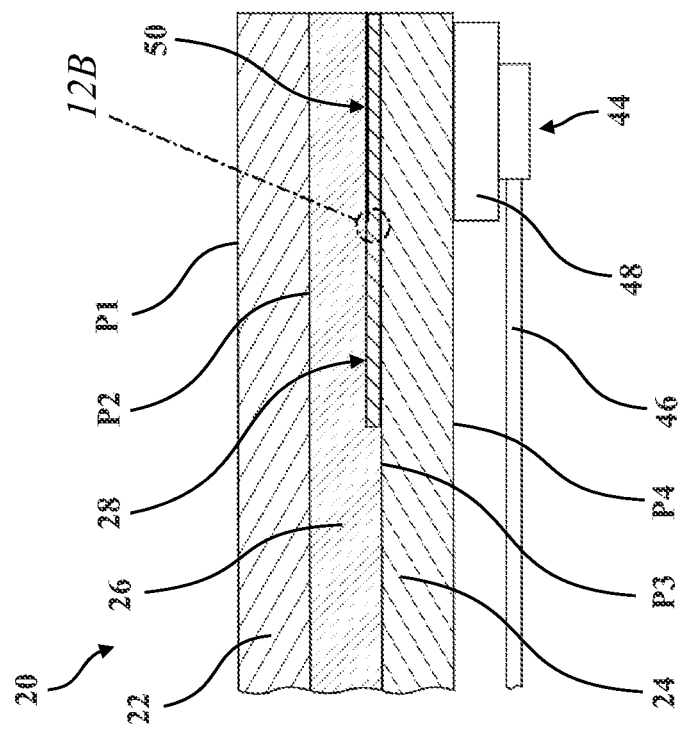
FIG. 12A is a cross-sectional schematic representation of the laminated glazing assembly of FIG. 11A taken along line 12A-12A and including the antenna assembly including the coupling portion disposed between the polymeric interlayer and the inner glass substrate.
Figure 13:
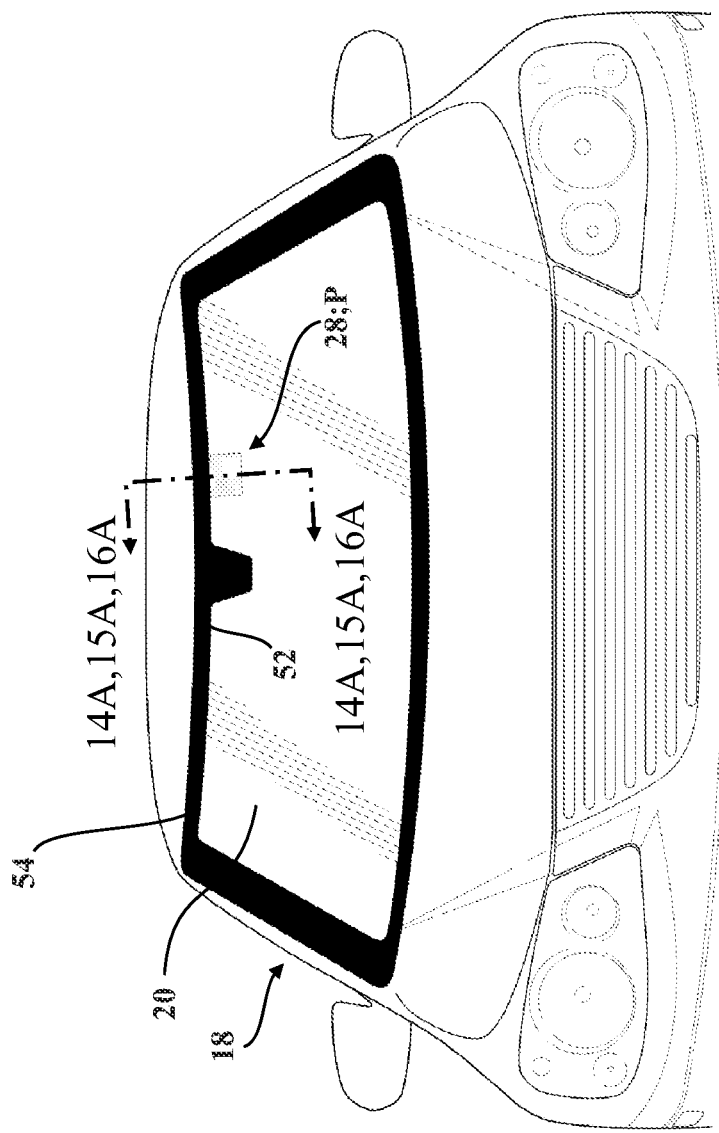
FIG. 13 is a partial front view of a vehicle including a laminated glazing assembly including an opaque band and the antenna assembly.
Figure 14A:
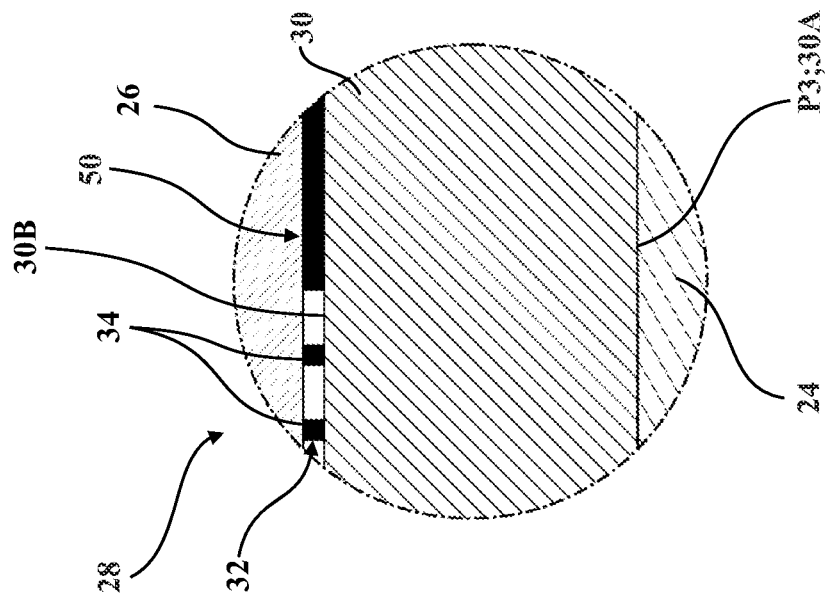
FIG. 14A is a cross-sectional schematic representation of the laminated glazing assembly of FIG. 11 taken along line 14A-14A and showing the opaque band disposed on the outer glass substrate and the antenna assembly disposed between the inner glass substrate and the polymeric interlayer.
Figure 14B:
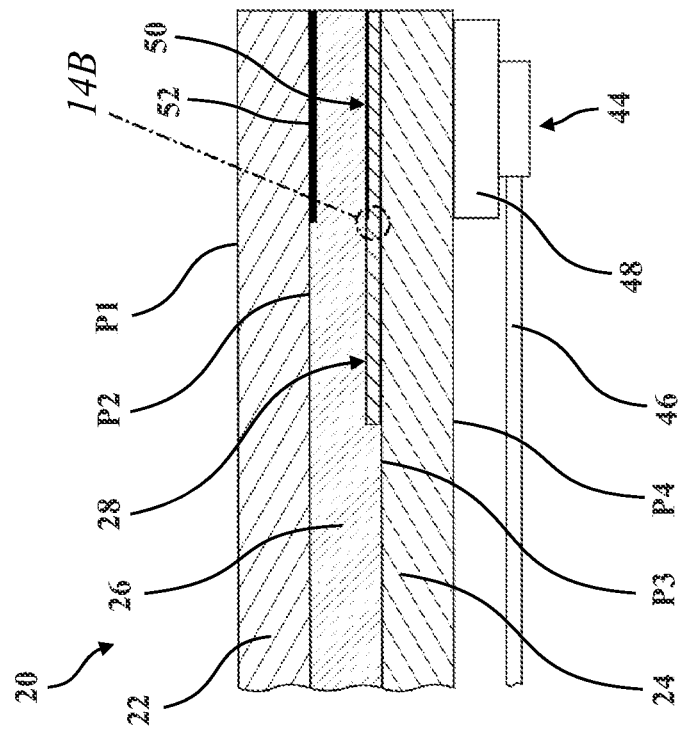
FIG. 14B is a detail view of FIG. 14A showing an enlarged cross-sectional schematic representation of the laminated glazing assembly including conductive wires and the coupling portion disposed on the second surface of the film layer.
Figure 15B:
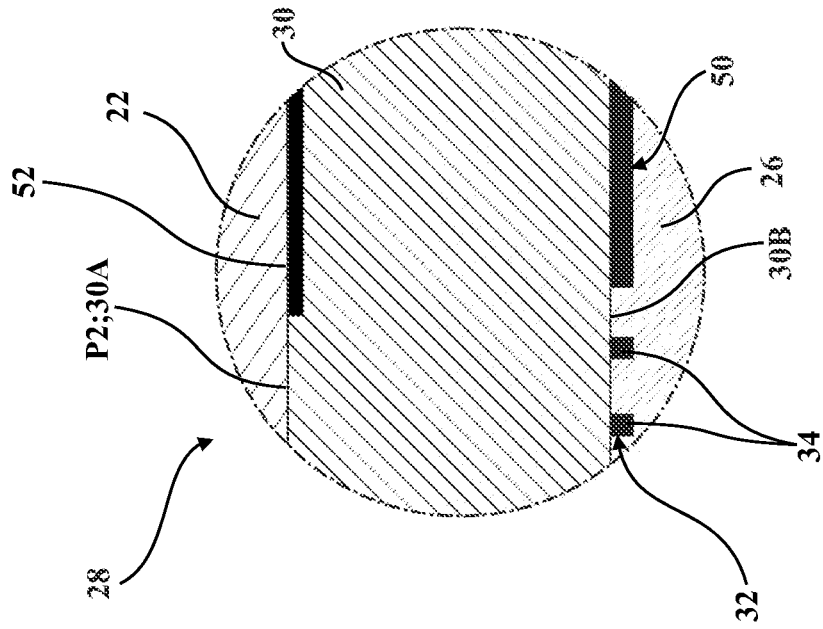
FIG. 15B is a detail view of FIG. 15A showing an enlarged cross-sectional schematic representation of the laminated glazing assembly including conductive wires and the coupling portion disposed on the second surface of the film layer.
Figure 15A:
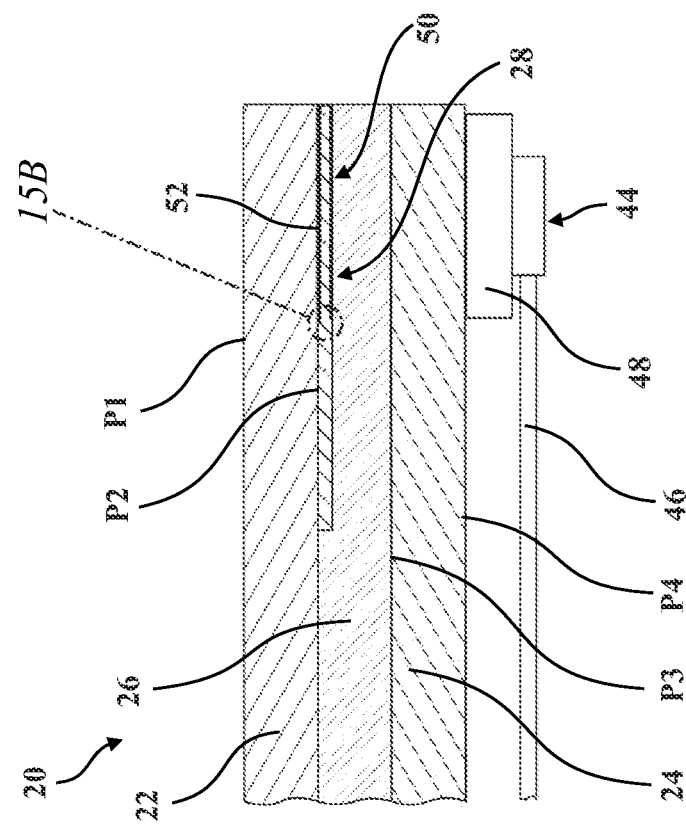
FIG. 15A is a cross-sectional schematic representation of the laminated glazing assembly of FIG. 11 taken along line 15A-15A and showing the opaque band disposed on the outer glass substrate and the antenna assembly disposed between the outer glass substrate and the polymeric interlayer.
Figure 16B:
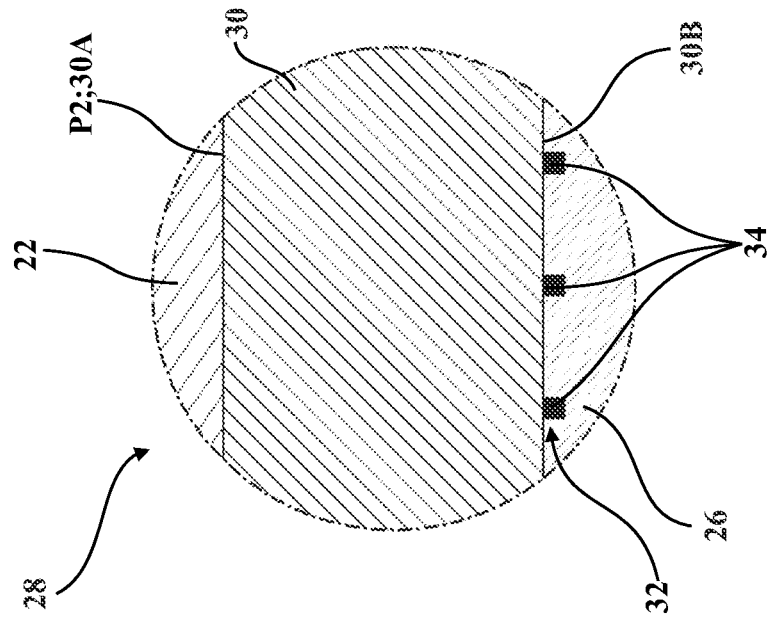
FIG. 16B is a detail view of FIG. 16A showing an enlarged cross-sectional schematic representation of the laminated glazing assembly including conductive wires disposed on the second surface of the film layer.
Figure 16A:
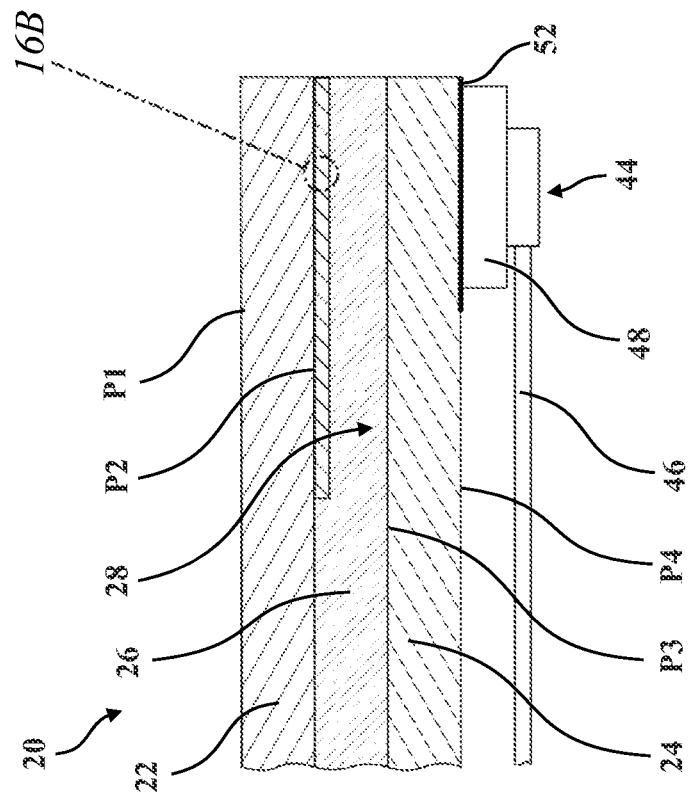
FIG. 16A is a cross-sectional schematic representation of the laminated glazing assembly of FIG. 11 taken along line 16A-16A and showing the opaque band disposed on the inner glass substrate and the antenna assembly disposed between the outer glass substrate and the polymeric interlayer.

The radiating element 32 includes conductive wires 34 disposed on one of the first surface 30A and the second surface 30B of the film layer 30. For example, FIGS. 3B and 5B show the conductive wires 34 disposed on the first surface 30A, and FIGS. 2B and 4B show the conductive wires 34 disposed on the second surface 30B. Preferably, the conductive wires 34 are disposed on only one of the first surface 30A or second surface 30B. However, it is to be appreciated that the conductive wires 34 could be disposed on both the first surface 30A and second surface 30B. The conductive wires 34 have a wire thickness WT. Although not required, in many embodiments, the wire thickness WT is 20 micrometers or less. For example, the conductive wires 34 may have a circular cross-section defining the wire thickness WT and have a diameter of 20 micrometers or less. In another example, the conductive wires 34 may have a rectangular cross-section defining the wire thickness WT and have a height and/or width of 20 micrometers or less. Accordingly, due to the relatively thin thickness of the conductive wires 34 as compared to conventional conductive wires used in conventional antenna assemblies, the radiating element 32 may be substantially imperceptible to the human eye when viewed through the laminated glazing assembly 20. Thus, in certain embodiments, since both the transparent film layer 30 and the radiating element 32 are substantially transparent, the antenna assembly 28 as a whole may be substantially transparent. For example, the laminated glazing assembly 20 may define a total surface area, and the antenna assembly 28 may only disposed on a portion P of the laminated glazing assembly 20 that is less than the total surface area, and the portion P of the laminated glazing assembly 20 may have a transmittance of 70% or greater. One suitable technique for measuring the transmittance of the laminated glazing assembly 20 is provided in ISO 13837 (2021), which is entitled "Road vehicles—Safety glazing materials—Method for the determination of solar transmittance" and is incorporated by reference in its entirety. Broadly, ISO 13837 provides that transmittance of a laminated glazing assembly may be measured using a spectrophotometer to observe the behavior of light as the light passes through the laminated glazing assembly.

The antenna assembly 28 has an antenna thickness AT1. The antenna thickness AT1 is defined as the cumulative thickness of the film thickness FT of the film layer 30 and the wire thickness WT of the conductive wires 34 defining the radiating element 32. In some embodiments, the antenna thickness AT1 is 100 micrometers or less. For example, the antenna thickness AT1 may be 100 micrometers or less, 90 micrometers or less, 80 micrometers or less, 70 micrometers or less, 60 micrometers or less, 50 micrometers or less, 25 micrometers or less, or 10 micrometers or less. Advantageously, the thin antenna thickness AT1 relative to the polymeric interlayer 26 allows the antenna assembly 28 to be included within the laminated glazing assembly 20 without the need to cut a void into the polymeric interlayer 26 to receive the antenna assembly 28. In other words, the polymeric interlayer 26 is flexible and compressible enough to deflect and accommodate the antenna assembly 28 within the laminated glazing assembly 20 such that cutting a void into the polymeric interlayer 26 to receive the antenna assembly 28 is not necessary.

The radiating element 32 is configured to be energized to transmit and/or receive frequency signals. In other words, the conductive wires 34 define the radiating element 32 having any suitable structure to transmit and/or receive radio frequency signals including, but not limited to, monopole antennas, dipole antennas, patch antennas, slot antennas, vivaldi antennas, conical antennas, bulbous antennas, horn antennas, and the like. Additionally, the radiating element 32 may be configured to transmit and/or receive radio frequency signals within any of a number of standard frequencies including, but not limited to, amplitude modulation (AM), frequency modulation (FM), Digital Audio Broadcasting (DAB), Remote Keyless Entry (RKE), Digital television (DTV), Global Positioning System (GPS), 2G cellular, 3G cellular, and 4G cellular. The radiating element 32 may also be configured to transmit and/or receive low and mid-band 5G radio frequency signals having a frequency of from 410 megahertz to 7.125 gigahertz, as well as millimeter-wave 5G radio frequency signals having a frequency of from 24 gigahertz to 100 gigahertz.

Referring back to FIG. 1B, the conductive wires 34 may be arranged to form a mesh 36. For example, the mesh 36 may be defined by a grid of conductive wires 34 that are spaced from each other and intersect to define the mesh 36. In the mesh 36, the conductive wires 34 are arranged at an angle α relative to each other. The angle α may be about 90 degrees such that the conductive wires 34 are orthogonal to each other, or the angle α may be an oblique angle. Additionally, the conductive wires 34 may be spaced from each other at a pitch width PW. Other patterns defining the mesh 36 are contemplated including, but not limited to, a honeycomb pattern. The mesh 36 also defines apertures 38 between each conductive wire 34. An aperture ratio of the mesh 36 (i.e., the area ratio of apertures 38 to the conductive wires 34) may be 90% or greater. The conductive wires 34 have a suitable thickness and may be arranged in any suitable manner to define the mesh 36 having the aperture ratio of 90% or greater. For example, the wire thickness WT of the wires may be 20 micrometers or less, 15 micrometers or less, 10 micrometers or less, 8 micrometers or less, 6 micrometers or less, 4 micrometers or less, or 2 micrometers or less. Further, the pitch width PW of the mesh 36 may be 800 micrometers or less, 700 micrometers or less, 600 micrometers or less, 500 micrometers or less, 400 micrometers or less, 300 micrometers or less, 200 micrometers or less, or 100 micrometers or less. All combinations of the example wire thickness WT and pitch width PW values listed above and all fractional values therebetween are contemplated. Ultimately, the mesh 36 may be designed such that the radiating element 32 has comparable radiating characteristics to a solid metal foil having similar geometry. Additionally, due to the high aperture ratio of the mesh 36, the mesh 36 may be substantially imperceptible when viewed with the human eye through the laminated glazing assembly 20. Thus, in some embodiments, since both the transparent film layer 30 and the radiating element 32 including the mesh 36 are substantially transparent, the antenna assembly 28 as a whole is substantially transparent when viewed through the laminated glazing assembly 20.

FIGS. 6A-10B illustrate numerous examples of the laminated glazing assembly 20 where the antenna assembly 28 is disposed between the polymeric interlayer 26 and the P3 surface of the inner glass substrate 24. It should be appreciated that in examples where the antenna assembly 28 is instead disposed between the polymeric interlayer 26 and the P2 surface of the outer glass substrate 22, the configurations illustrated in FIGS. 6A-10B would have substantially the same structure, but instead be disposed in relation to the P2 surface of the inner glass substrate 24.

In some embodiments, the laminated glazing assembly 20 includes an adhesive layer 40. The adhesive layer 40 may be disposed between the first surface 30A of the film layer 30 and one of the P2 surface and the P3 surface to couple the transparent film layer 30 to one of the P2 surface and the P3 surface. In other words, as illustrated in FIGS. 6A-7B, in examples where the antenna assembly 28 is disposed between the polymeric interlayer 26 and the P3 surface, the adhesive layer 40 is disposed between the first surface 30A of the film layer 30 and the P3 surface to couple the film layer 30 to the P3 surface. Likewise, although not shown, in examples where the antenna assembly 28 is disposed between the polymeric interlayer 26 and the P2 surface of the outer glass substrate 22, the adhesive layer 40 is disposed between the first surface 30A of the film layer 30 and the P2 surface to couple the film layer 30 to the P2 surface. The adhesive layer 40 may have a transmittance of 85% or greater, 90% or greater, or 95% or greater (e.g. as measured according to ASTM D1003). The adhesive layer 40 has an adhesive thickness AT2. Although not required, the adhesive thickness AT2 may be 50 micrometers or less, 45 micrometers or less, 40 micrometers or less, 35 micrometers or less, 30 micrometers or less, 25 micrometers or less, 20 micrometers or less, 15 micrometers or less, 10 micrometers or less, or 5 micrometers or less. The adhesive layer 40 may comprise any suitable materials including, but not limited to, acrylic, silicone, and urethane.

As best shown in FIG. 6B, in examples where the antenna assembly 28 is disposed between the polymeric interlayer 26 and the P3 surface, and the conductive wires 34 are disposed on the second surface 30B of the film layer 30, the adhesive layer 40 couples the first surface 30A of the film layer 30 to the P3 surface of the inner glass substrate 24, and the polymeric interlayer 26 at least partially encapsulates the conductive wires 34. Referring to FIG. 7B, in examples where the antenna assembly 28 is disposed between the polymeric interlayer 26 and the P3 surface and the conductive wires 34 are disposed on the first surface 30A of the film layer 30, the adhesive layer 40 couples the first surface 30A of the film layer 30 to the P3 surface of the inner glass substrate 24 and at least partially encapsulates the conductive wires 34 between the first surface 30A of the film layer 30 and the P3 surface of the inner glass substrate 24. Similarly, although not shown, in examples where the antenna assembly 28 is disposed between the polymeric interlayer 26 and the P2 surface, and the conductive wires 34 are disposed on the second surface 30B of the film layer 30, the adhesive layer 40 couples the first surface 30A of the film layer 30 to the P2 surface, and the polymeric interlayer 26 at least partially encapsulates the conductive wires 34. Further, although also not shown, in examples where the antenna assembly 28 is disposed between the polymeric interlayer 26 and the P2 surface and the conductive wires 34 are disposed on the first surface 30A of the film layer 30, the adhesive layer 40 couples the first surface 30A of the film layer 30 to the P2 surface and at least partially encapsulates the conductive wires 34 between the first surface 30A of the film layer 30 and the P2 surface.

Advantageously, disposing the adhesive layer 40 between the film layer 30 and one of the P2 surface and the P3 surface may facilitate the assembly process of the laminated glazing assembly 20. For example, the film layer 30 may be coupled to one of the P2 surface and the P3 surface via the adhesive layer 40 before the polymeric interlayer 26 is disposed between the outer glass substrate 22 and the inner glass substrate 24 and subsequently laminated. Accordingly, the adhesive layer 40 maintains the film layer 30 in the proper position during the lamination process.

Further advantageously, disposing the adhesive layer 40 between the film layer 30 and one of the P2 surface and the P3 surface improves the adhesion of the film layer 30 to one of the P2 surface and the P3 surface. Thus, in configurations including the adhesive layer 40, the adhesive layer 40 and the polymeric interlayer 26 cooperate to retain the outer glass substrate 22 and/or the inner glass substrate 24 in the event of impact or breakage of the laminated glazing assembly 20. This is particularly important for the portion P of the laminated glazing assembly 20 including the antenna assembly 28. As described above, conventional arrangements for disposing a film layer in a conventional laminated glazing assembly present issues with having sufficient retention of the glass in the region of the conventional laminated glazing assembly including the film layer. Here, however, the addition of the adhesive layer 40 to the laminated glazing assembly 20 between one of the P2 surface and the P3 surface and the antenna assembly 28 provides for sufficient retention of the outer glass substrate 22 and/or the inner glass substrate 24 in the event of impact or breakage such that the portion P of the laminated glazing assembly 20 including the antenna assembly 28 exhibits both impact resistance and penetration resistance in compliance with SAE J3097/ANSI Z26.1 as measured under SAE J3097/ANSI Z26.1.

SAE J3097/ANSI Z26.1 (2019) is entitled "Standard for Safety Glazing Materials for Glazing Motor Vehicles and Motor Vehicle Equipment Operating on Land Highways" and is incorporated by reference in its entirety. Broadly, SAE J3097/ANSI Z26.1 specifies testing procedures for dropping steel balls of varying weights from a variety of heights onto a representative coupon of a laminated glazing assembly to determine the laminated glazing assembly's impact resistance and penetration resistance. For example, to test impact resistance, an approximately 0.5 pound smooth, steel sphere may be dropped from a height of 10 meters onto a coupon representative of the portion P of the laminated glazing assembly 20 where the antenna assembly 28 is disposed. To test penetration resistance, an approximately 5 pound smooth, steel sphere may be dropped from a height of 4 meters onto a coupon representative of the portion P of the laminated glazing assembly 20 where the antenna assembly 28 is disposed. SAE J3097/ANSI Z26.1 further specifies acceptable test results that indicate whether the laminated glazing assembly has sufficient impact resistance and penetration resistance to meet the standard. Ultimately, compliance with SAE J3097/ANSI Z26.1 is required for compliance with Federal Motor Vehicle Safety Standard No. 205, which is entitled "Glazing Materials" and is incorporated by reference in its entirety. Thus, in embodiments where the adhesive layer 40 is included in the laminated glazing assembly 20, the portion P of laminated glazing assembly 20 where the antenna assembly 28 is disposed exhibits sufficient impact (e.g. an object such as a stone striking the P1 surface of the laminated glazing assembly 20) and penetration (e.g. an object such as a passenger's head striking the P4 surface of the laminated glazing assembly 20) resistance characteristics to meet automotive industry standards.

Referring to FIGS. 8A-8B, in some embodiments, the laminated glazing assembly 20 includes an insulation layer 42. Particularly, where the conductive wires 34 are disposed on the second surface 30B of the film layer 30, the insulation layer 42 is disposed between the film layer 30 and the polymeric interlayer 26. Accordingly, the insulation layer 42 may at least partially encapsulate the conductive wires 34 between the second surface 30B of the film layer 30 and the polymeric interlayer 26. The insulation layer 42 provides advantages in the assembly process of the laminated glazing assembly 20. Particularly, the insulation layer 42 may be deposited over the film layer 30 and the conductive wires 34 such that the conductive wires 34 are not touched (either by a human or a machine) when the antenna assembly 28 is disposed between one of the P2 surface and the P3 surface and the polymeric interlayer 26 and subsequently laminated (along with the outer glass substrate 22) to form the laminated glazing assembly 20. Although not required, the insulation layer 42 may have a transmittance of 85% or greater, 90% or greater, or 95% or greater (e.g. as measured according to ASTM D1003). The insulation layer 42 has an insulation thickness IT. Although not required, the insulation thickness IT may be 20 micrometers or less, 15 micrometers or less, 10 micrometers or less, 5 micrometers or less, 1 micrometer or less, or 0.5 micrometers or less. The insulation thickness IT is preferably larger than the wire thickness WT of the conductive wires 34. For example, if the conductive wires 34 have a wire thickness WT of 5 micrometers, the insulation layer 42 preferably have an insulation thickness IT of 7 micrometers or more such that, even where the insulation layer 42 at least partially encapsulates the conductive wires 34, the insulation layer 42 extends beyond the conductive wires 34 to insulate the conductive wires 34 from the polymeric interlayer 26. The insulation layer 42 may comprise any suitable materials including, but not limited to silicon dioxide ($SiO_2$).

In some embodiments, the laminated glazing assembly 20 includes both the adhesive layer 40 and the insulation layer 42. Referring to FIGS. 9A and 9B, in examples where the film layer 30 is disposed between the P3 surface of the inner glass substrate 24 and the polymeric interlayer 26, and the conductive wires 34 are disposed on the second surface 30B, the insulation layer 42 is disposed between the film layer 30 and the polymeric interlayer 26, and the adhesive layer 40 is disposed between the first surface 30A and the P3 surface to couple the film layer 30 to the P3 surface. Similarly, although not shown, in examples where the film layer 30 is disposed between the P2 surface of the outer glass substrate 22 and the polymeric interlayer 26, and the conductive wires 34 are disposed on the second surface 30B, the insulation layer 42 is disposed between the film layer 30 and the polymeric interlayer 26, and the adhesive layer 40 is disposed between the first surface 30A and the P2 surface to couple the film layer 30 to the P2 surface. Notably, even with the inclusion of the adhesive layer 40 and/or the insulation layer 42 disposed on either side of the antenna assembly 28, the portion P of the laminated glazing assembly 20 including the antenna assembly 28 may have a transmittance of 70% or greater. Importantly, because the portion P of the laminated glazing assembly 20 including the antenna assembly 28 may have a transmittance of 70% or greater, the antenna assembly 28 can be arranged within the field of view of a driver of the vehicle 18, while still maintaining compliance with the visibility requirements of FMVSS 205.

Referring to FIGS. 10A and 10B, in some embodiments, the laminated glazing assembly 20 includes a feeding element 44 coupled to the P4 surface of the inner glass substrate 24. The feeding element 44 may be capacitively coupled to the antenna assembly 28 to energize the antenna assembly 28 to transmit and/or receive radio frequency signals. For example, the feeding element 44 may include a coaxial cable 46 attached to a coupler 48. The coupler 48 may comprise a printed circuit board in electrical communication with the coaxial cable 46 and facing the P4 surface of the inner glass substrate 24 to capacitively couple the coaxial cable 46 to the antenna assembly 28 to energize the antenna assembly 28 to transmit and/or receive radio frequency signals. To secure the coupler 48 to the P4 surface, a feeding adhesive layer 49 may be provided between the coupler 48 and the P4 surface of the inner glass substrate 24 to couple the feeding element 44 to the P4 surface of the inner glass substrate 24. Of course, other suitable structures constituting a feeding element 44 configured to capacitively couple to the antenna assembly 28 to energize the antenna assembly 28 to transmit and/or receive radio frequency signals are contemplated. Although FIGS. 10A and 10B show the conductive wires 34 of the antenna assembly 28 disposed on the second surface 30B of the film layer 30, it should be appreciated that the conductive wires 34 may alternatively be disposed on the first surface 30A of the film layer 30. Likewise, although FIGS. 10A and 10B shows the antenna assembly 28 disposed between the P3 surface and the polymeric interlayer, it should be appreciated that the feeding element 44 may be configured to 28 to energize the antenna assembly 28 to transmit and/or receive radio frequency signals in examples where the antenna assembly is disposed between the P2 surface and the polymeric interlayer 26. Furthermore, although not shown in FIGS. 10A and 10B, the laminated glazing assembly 20 may also include the adhesive layer 40 and/or the insulating layer 42, as described in the context of FIGS. 6A-9B above.

Referring to FIGS. 11A-12B, in some examples, the antenna assembly 28 further includes a coupling portion 50 disposed on the same surface of the film layer 30 as the conductive wires 34 and electrically coupled to the conductive wires 34. Here, the feeding element 44 is coupled to the P4 surface of the inner glass substrate 24 (as described above) and may be aligned with and capacitively coupled to the coupling portion 50 of the antenna assembly 28 to energize the antenna assembly 28 to transmit and/or receive radio frequency signals. Accordingly, the feeding element 44 is neither hard-wired nor in direct contact with the antenna assembly 28 and is generally disposed non-coplanar with the antenna assembly 28. The feeding element 44 may induce electrical current to the antenna assembly 28 through the inner glass substrate 24 and/or the polymeric interlayer 26.

The coupling portion 50 may comprise a conductive structure that is more dense than the radiating element 32 of the antenna assembly 28. For example, the coupling portion 50 may comprise a conductive foil 51 or conductive feeding wires arranged to form a feeding mesh. The feeding mesh may have a lower aperture ratio than the mesh 36. In other examples, however, the feeding mesh having the same properties (e.g. wire thickness WT, pitch width PW, and aperture ratio) as the mesh 36. In any event, the coupling portion 50 provides a conductive structure between the radiating element 32 and the feeding element 44 to promote capacitive coupling of the feeding element 44 to the antenna assembly 28 to energize the antenna assembly 28 to transmit and/or receive radio frequency signals. Notably, addition of the coupling portion 50 to the antenna assembly 28 to improve capacitive coupling between the feeding element 44 and the antenna assembly 28 consequently improves the performance of the antenna assembly 28 at higher frequencies (such as 5G cellular).

The coupling portion 50 and/or the feeding element 44 may be perceptible to the human eye (i.e., less than transparent) when looking through the laminated glazing assembly 20. Therefore, referring to FIGS. 13-16B, it is contemplated that the laminated glazing assembly 20 may include an opaque band 52 disposed on one of the P2 surface and the P4 surface and at least partially extending around a peripheral edge 54 of the laminated glazing assembly 20. Of course, it should be appreciated that the opaque band 52 may extend around the entire peripheral edge 54 of the laminated glazing assembly 20. The opaque band 52 may comprise any suitable material and may be applied using any suitable process. For example, the opaque band 52 may be formed from ceramic frit that is fired into one of the P2 surface of the outer glass substrate 22 and the P4 surface of the inner glass substrate 24, or from an ink that is printed on one of the P2 surface of the outer glass substrate 22 and the P4 surface of the inner glass substrate 24. Other configurations of the opaque band 52 are contemplated. The opaque band 52 serves a number of additional functions. The opaque band 52 blocks transmission of light through the region of the laminated glazing assembly 20 extending around the peripheral edge 54. In doing so, the opaque band 52 prevents UV light from deteriorating an underlying adhesive that bonds the laminated glazing assembly 20 to the vehicle 18. As another example, the opaque band 52 may extend further down from the top of the laminated glazing assembly 20 to function as a sunshade to shield a driver's eyes from sunlight. The opaque band 52 may also block visibility of the underlying adhesive to an outside observer, providing an improved aesthetic exterior appearance. Further, the opaque band 52 may define a decorative pattern that is aesthetically pleasing, such as a dot pattern, a manufacturer logo, or governmentally required information (such as information required by FMVSS 205).

In the examples illustrated in FIGS. 14A-15B, the opaque band 52 is disposed on the P2 surface and the coupling portion 50 of the antenna assembly 28 is arranged at the peripheral edge 54 of the laminated glazing assembly 20 such that the opaque band 52 obscures the coupling portion 50 and the feeding element 44 as the laminated glazing assembly 20 is viewed from the P1 surface. In the examples shown in FIGS. 14A and 14B, the antenna assembly 28 is disposed between the P3 surface and the polymeric interlayer 26, and the opaque band 52 obscures the coupling portion 50 and the feeding element 44 as the laminated glazing assembly 20 is viewed from the P1 surface. Similarly, in the examples shown in FIGS. 15A and 15B, the antenna assembly 28 is disposed between the P2 surface (including the opaque band 52) and the polymeric interlayer 26, and the opaque band 52 obscures the coupling portion 50 and the feeding element 44 as the laminated glazing assembly 20 is viewed from the P1 surface. In the example illustrated in FIGS. 16A-16B, the antenna assembly 28 is disposed between the P2 surface and the polymeric interlayer 26, and the opaque band 52 is disposed on the P4 surface such that the opaque band 52 obscures the feeding element 44 as the laminated glazing assembly 20 is viewed from the P1 surface.

Although FIGS. 11A-16B show the conductive wires 34 and the coupling portion 50 of the antenna assembly 28 disposed on the second surface 30B of the film layer 30, it should be appreciated that the conductive wires 34 and the coupling portion 50 may alternatively be disposed on the first surface 30A of the film layer 30. Furthermore, although not shown in FIGS. 1A-16B, the laminated glazing assembly 20 may also include the adhesive layer 40 and/or the insulating layer 42, as described in the context of FIGS. 6A-9B above.

Several embodiments have been described in the foregoing description. However, the embodiments described herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

What is claimed is:

1. A laminated glazing assembly comprising:
    an outer glass substrate having an outer surface (P1) and an opposing inner surface (P2);
    an inner glass substrate having an inner surface (P3) and an opposing outer surface (P4);
    an opaque band disposed on one of the P2 surface and the P4 surface and extending at least partially around a peripheral edge of the laminated glazing assembly;
    a polymeric interlayer disposed between the P2 surface of the outer glass substrate and the P3 surface of the inner glass substrate;
    an antenna assembly disposed between the polymeric interlayer and one of the P2 surface and the P3 surface and assembly comprising:
        a film layer including a first surface facing one of the P2 surface and the P3 surface and an opposing second surface facing the polymeric interlayer;
        a plurality of conductive wires disposed on one of the first surface and the second surface of the film layer and arranged to form a mesh having an aperture ratio of 90% or greater; and
        a coupling portion electrically coupled to the mesh and disposed on the same surface of the film layer as the conductive wires and arranged at the peripheral edge of the laminated glazing assembly; and
    a feeding element coupled to the P4 surface and aligned with the coupling portion such that the opaque band obscures the feeding element as the laminated glazing assembly is viewed from the P1 surface, the feeding element capacitively coupled to the coupling portion of the antenna assembly to energize the antenna assembly to transmit and/or receive 5G radio frequency signals.

2. The laminated glazing assembly of claim 1, wherein the film layer is a transparent film layer.

3. The laminated glazing assembly of claim 2, wherein the transparent film layer has a refractive index of from 1.45 to 1.55.

4. The laminated glazing assembly of claim 2, wherein a refractive index of the transparent film layer is within 0.05 of the refractive index of at least one of the outer glass substrate, the inner glass substrate, and/or the polymeric interlayer.

5. The laminated glazing assembly of claim 2, wherein the transparent film layer has a transmittance of 85% or greater.

6. The laminated glazing assembly of claim 2, wherein the transparent film layer has a haze of less than 1%.

7. The laminated glazing assembly of claim 2, wherein the transparent film layer is selected from one of cellulose triacetate and cyclic olefin polymer.

8. The laminated glazing assembly of claim 1, further comprising an adhesive layer having a transmittance of 85% or greater and disposed between the first surface of the film layer and one of the P2 surface and the P3 surface to couple the film layer to one of the P2 surface and the P3 surface.

9. The laminated glazing assembly of claim 8, wherein the conductive wires are disposed on the first surface of the film layer such that the adhesive layer at least partially encapsulates the conductive wires between the first surface of the film layer and one of the P2 surface and the P3 surface.

10. The laminated glazing assembly of claim 8, wherein:
the laminated glazing assembly defines a total surface area, and the antenna assembly is only disposed on a portion of the laminated glazing assembly that is less than the total surface area; and
the portion of the laminated glazing assembly exhibits both impact resistance and penetration resistance in compliance with SAE J3097/ANSI Z26.1 as measured under SAE J3097/ANSI Z26.1.

11. The laminated glazing assembly of claim 1, wherein:
the conductive wires are disposed on the second surface of the film layer; and
the laminated glazing assembly further comprises an insulation layer having a transmittance of 85% or greater and disposed between the film layer and the polymeric interlayer such that the insulation layer at least partially encapsulates the conductive wires between second surface of the film layer and the polymeric interlayer.

12. The laminated glazing assembly of claim 1, wherein:
the conductive wires have a wire thickness of 20 micrometers or less; and
the conductive wires are arranged to form a mesh having an aperture ratio of 90% or greater.

13. The laminated glazing assembly of claim 1, wherein the antenna assembly is configured to transmit and/or receive 5G radio frequency signals having a frequency of from 410 megahertz to 7.125 gigahertz.

14. The laminated glazing assembly of claim 1, wherein the opaque band is formed from ceramic frit that is fired into one of the inner surface (P2) of the outer glass substrate and the outer surface (P4) of the inner glass substrate.

15. The laminated glazing assembly of claim 1, wherein the opaque band is formed from an ink that is printed on one of the inner surface (P2) of the outer glass substrate and the outer surface (P4) of the inner glass substrate.

16. The laminated glazing assembly of claim 1, wherein the coupling portion of the antenna assembly comprises conductive foil.

17. The laminated glazing assembly of claim 1, wherein the coupling portion of the antenna assembly comprises conductive feeding wires arranged to form a feeding mesh.

\* \* \* \* \*